(12) United States Patent
Shimono et al.

(10) Patent No.: US 10,100,212 B2
(45) Date of Patent: Oct. 16, 2018

(54) INK COMPOSITION, INK SET, AND INK JET RECORDING METHOD

(71) Applicant: FUJIFILM Corporation, Tokyo (JP)

(72) Inventors: Katsuhiro Shimono, Kanagawa (JP); Katsuyuki Yofu, Kanagawa (JP); Seiya Sakurai, Kanagawa (JP); Toshihiro Kamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 132 days.

(21) Appl. No.: 15/218,101

(22) Filed: Jul. 25, 2016

(65) Prior Publication Data

US 2016/0333209 A1    Nov. 17, 2016

Related U.S. Application Data

(63) Continuation of application No. PCT/JP2014/081099, filed on Nov. 25, 2014.

(30) Foreign Application Priority Data

Feb. 20, 2014    (JP) .................. 2014-030611

(51) Int. Cl.
| | |
|---|---|
| *B41J 2/21* | (2006.01) |
| *C09D 11/38* | (2014.01) |
| *C09D 11/54* | (2014.01) |
| *B41M 5/00* | (2006.01) |
| *C09D 11/10* | (2014.01) |
| *B41J 2/01* | (2006.01) |
| *C09D 11/107* | (2014.01) |
| *C09D 11/322* | (2014.01) |
| *C09D 11/326* | (2014.01) |
| *C09D 11/40* | (2014.01) |
| *C09D 133/12* | (2006.01) |

(52) U.S. Cl.
CPC ............... *C09D 11/38* (2013.01); *B41J 2/01* (2013.01); *B41M 5/0017* (2013.01); *C09D 11/10* (2013.01); *C09D 11/107* (2013.01); *C09D 11/322* (2013.01); *C09D 11/326* (2013.01); *C09D 11/40* (2013.01); *C09D 11/54* (2013.01); *C09D 133/12* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 5,580,373 | A | 12/1996 | Lane et al. |
| 5,693,129 | A | 12/1997 | Lin |
| 7,141,353 | B2 | 11/2006 | Oshima |
| 7,927,772 | B2 | 4/2011 | Suzuki |
| 8,465,836 | B2 | 6/2013 | Yamauchi et al. |
| 9,405,199 | B2 | 8/2016 | Sugawara et al. |
| 9,829,818 | B2 | 11/2017 | Yoshida et al. |
| 2011/0069111 | A1 | 3/2011 | Matsumoto et al. |

FOREIGN PATENT DOCUMENTS

| | | |
|---|---|---|
| JP | H09-176538 A | 7/1997 |
| JP | 2011-079901 A | 4/2011 |
| WO | 2007/130345 A2 | 11/2007 |

OTHER PUBLICATIONS

International Search Report—PCT/JP2014/081099 dated Jan. 20, 2015.
Written Opinion—PCT/JP2014/081099 dated Jan. 20, 2015.
(Continued)

*Primary Examiner* — Manish S Shah
(74) *Attorney, Agent, or Firm* — Studebaker & Brackett PC

(57) ABSTRACT

An ink composition contains (a) a compound which is represented by the following Formula (1) and has a specific molecular weight, (b) a colorant, (c) a polymer having an SP value of equal to or greater than 17 and equal to or less than 24, and (d) water, in which there is a specific relationship between a log P value of the component (a) and an SP value of the component (c). An ink set contains the ink composition, and an ink jet recording method uses the ink composition:

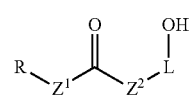

Formula (1)

R represents a specific alkyl group; $Z^1$ represents a single bond, $-NR^1-$, or $-O-$; $Z^2$ represents $-NR^1-$ or $-O-$; at least one of $Z^1$ or $Z^2$ is $-NR^1-$; $R^1$ represents a hydrogen atom or a specific alkyl group; and L represents a specific alkylene group or $-C_2H_4-O-C_2H_4-$.

14 Claims, No Drawings

(56) References Cited

OTHER PUBLICATIONS

The extended European search report issued by the European Patent Office on Dec. 16, 2016, which corresponds to European Patent Application No. 14883262.9-1302 and is related to U.S. Appl. No. 15/218,101.
Translation of Written Opinion—PCT/JP2014/081099 dated Jan. 20, 2015.
International Preliminary Report on Patentability—PCT/JP2014/081099 dated Aug. 23, 2016.
Arup K. Ghose et al., "Atomic Physicochemical Parameters for Three-Dimensional-Structure-Directed Quantitative Structure-Activity Relationships", American Chemical Society, J. Chem. Inf. Comput. Sci., 1987, vol. 27, No. 1, pp. 21-35.
Toshinao Okitsu, "A Role of Solubility Parameter (SP) in Solubility Theories Part II, Developments of Some Solubility Theories", Journal of the Adhesion Society of Japan, 1993, vol. 29, No. 6, pp. 249-259.

INK COMPOSITION, INK SET, AND INK JET RECORDING METHOD

CROSS-REFERENCE TO RELATED APPLICATIONS

This application is a Continuation of PCT International Application No. PCT/JP2014/081099 filed on Nov. 25, 2014, which claims priority under 35 U.S.C. § 119(a) to Japanese Patent Application No. 2014-030611 filed on Feb. 20, 2014. Each of the above application(s) is hereby expressly incorporated by reference, in its entirety, into the present application.

BACKGROUND OF THE INVENTION

1. Field of the Invention

The present invention relates to an ink composition, an ink set, and an ink jet recording method.

2. Description of the Related Art

As image recording methods in which an image is formed on a recording medium such as paper based on an image data signal, there are an electrophotographic method, a sublimation-type and fusion-type thermal transfer method, an ink jet method, and the like.

In the ink jet recording method, a printing plate is not required, and an image is directly formed on a recording medium by jetting an ink only to an image forming portion. Therefore, the ink can be used with excellent efficiency, and the running cost is low. Furthermore, in the ink jet method, a relatively cheap printing device is used, the printing device can be compactified, and little noise is generated. As described above, the ink jet method has more various advantages than other image recording methods.

So far, the ink jet recording method has been used mainly in the field of office and home printers. However, in recent years, the ink jet recording method has also been used in the field of commercial printing. In the field of commercial printing, the ink jet recording is required to have swiftness (high speed) greater than that of the ink jet recording method used so far.

However, if the time taken for processing such as drying or fixing after recording is shortened so as to speed up the ink jet recording, the permeation of water or an organic solvent in the ink into a recording medium or drying of the water or the organic solvent fails to keep pace with the recording speed, and as a result, in a state where the recording image remains undried, the next recording medium is stacked on the image. During the commercial printing, images are formed on hundreds to thousands of sheets of recording media at a time, and the recording media having undergone image formation are continuously stacked on each other. Therefore, the phenomena easily occur in which the image formed on a recording medium is transferred to the rear surface of another recording medium stacked thereon or the recording media are stuck together (hereinafter, these phenomena are referred to as "stacker blocking").

Methods for preventing the stacker blocking are being investigated. For example, JP2011-79901A describes a method for preventing stacker blocking by using an ink set containing resin particles, which contain a water-soluble organic solvent in an amount of equal to or less than 20% by mass and have a glass transition temperature of equal to or higher than 60° C., 4 color inks of YMCK, and at least one color ink among RGB inks.

During the ink jet recording, a phenomenon occurs in which water in the ink breaks hydrogen bonds of cellulose in paper as a recording medium and thus the recording medium is curled after drying. It is known that the curling phenomenon can be avoided by adding a specific compound to the ink. For example, JP1997-176538A (JP-H09-176538A) describes, as curling inhibitors formulated into the ink, 1,3-diemthylurea, imidazolidinone, and butylurea.

SUMMARY OF THE INVENTION

However, if the curling inhibitor described in JP1997-176538A (JP-H09-176538A) is added to the ink so as to inhibit curling, the compound remains in the image and acts as a plasticizer, and hence the stacker blocking easily occurs.

An object of the present invention is to provide an ink composition, which makes it difficult for a recording medium having undergone image formation to be curled and makes it difficult for stacker blocking to occur when being used for forming an image on the recording medium, and to provide an ink set containing the ink composition. Another object of the present invention is to provide an ink jet recording method including jetting the ink composition onto a recording medium.

The above objects of the present invention are achieved by the following means.

[1] An ink composition comprising:

(a) a compound which is represented by the following Formula (1) and has a molecular weight of equal to or greater than 130 and equal to or less than 300:

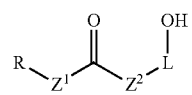

Formula (1)

In Formula (1), R represents an alkyl group having 1 to 10 carbon atoms. $Z^1$ represents a single bond, $-NR^1-$, or $-O-$. $Z^2$ represents $-NR^1-$ or $-O-$. Here, at least one of $Z^1$ or $Z^2$ is $-NR^1-$. $R^1$ represents a hydrogen atom or an alkyl group having 1 to 10 carbon atoms. L represents an alkylene group having 1 to 10 carbon atoms or $-C_2H_4-O-C_2H_4-$;

(b) a colorant;

(c) a polymer having an SP value of equal to or greater than 17 and equal to or less than 24; and (d) water, in which a log P value of the component (a) and an SP value of the component (c) satisfy the following Expression I.

$$-1.7 \leq \log P \text{ value of component}(a) \leq -0.0456 \times SP \text{ value of component}(c) + 0.6319 \quad \text{[Expression I]}$$

[2] The ink composition described in [1], in which R in the Formula (1) is an alkyl group having 1 to 6 carbon atoms.

[3] The ink composition described in [1] or [2], in which the component (a) is a compound represented by the following Formula (2) or (3):

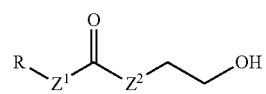

Formula (2)

-continued

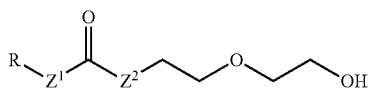

Formula (3)

In Formulae (2) and (3), each of R, $Z^1$, and $Z^2$ has the same definition as R, $Z^1$, and $Z^2$ in the Formula (1).

[4] The ink composition described in any one of [1] to [3], in which the component (a) is a compound represented by any one of the following Formulae (4) to (9):

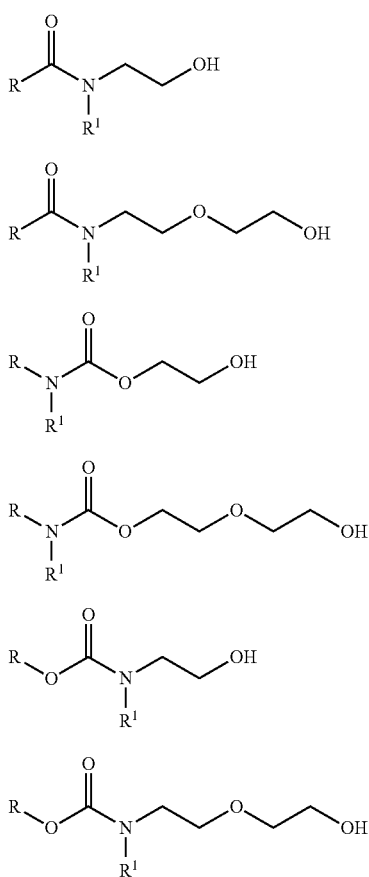

In Formulae (4) to (9), each of R and $R^1$ has the same definition as R and $R^1$ in the Formula (1).

[5] The ink composition described in any one of [1] to [4], in which the content of the component (a) is 1% by mass to 30% by mass.

[6] The ink composition described in any one of [1] to [5] that is an ink for ink jet recording.

[7] The ink composition described in any one of [1] to [6], in which the component (c) is fine polymer particles.

[8] An ink set comprising the ink composition described in any one of [1] to [7] and an acid treatment agent containing an acidic compound.

[9] The ink set described in [8], in which the acidic compound is an acid having a molecular weight of equal to or greater than 50 and equal to or less than 200 and a pKa value of equal to or greater than 1 and equal to or less than 5 in water at 25° C.

[10] An ink jet recording method comprising jetting the ink composition described in any one of [1] to [7] onto a recording medium.

[11] The ink jet recording method described in [10], in which the recording medium is a paper medium.

[12] The ink jet recording method described in [11], in which the paper medium is coated paper.

[13] The ink jet recording method described in any one of [10] to [12], further comprising an acid treatment step of applying an acid treatment agent containing an acidic compound onto the recording medium, and an ink applying step of jetting the ink composition described in any one of [1] to [7] onto the recording medium having undergone the acid treatment step such that an image is formed.

In the present specification, unless otherwise specified, in a case where there is a plurality of substituents, linking groups, ligands, and the like (hereinafter, referred to as "substituents and the like") denoted by a specific reference numeral, or in a case where a plurality of substituents and the like are collectively or selectively specified, the respective substituents and the like may be the same as or different from each other. The same will be applied in a case where the number of substituents and the like is specified.

In the present specification, the meaning of a "group" described as an example of each substituent includes both of an unsubstituted group and a group having a substituent. For example, an "alkyl group" means an alkyl group which may have a substituent.

In the present specification, in a case where the term "compound" is referred to by being added to the end of words, or in a case where a compound is called by a specific name or represented by a specific chemical formula, unless otherwise specified, the compound means a salt, complex, and ions thereof in addition to the compound itself.

The ink composition of the present invention makes it difficult for a recording medium to be curled even if the ink composition is jetted onto the recording medium so as to form an image, and can effectively prevent stacker blocking.

According to the ink jet recording method of the present invention, the recording medium having undergone image formation is not easily curled, and stacker blocking is effectively inhibited.

DESCRIPTION OF THE PREFERRED EMBODIMENTS

The present invention will be specifically described below.

[Ink Composition]

<Component (a)>

The ink composition of the present invention contains, as a component (a), a compound which is represented by the following Formula (1), has a specific molecular weight, and has a specific log P value which will be described later.

Formula (1)

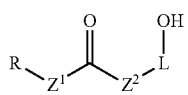

In Formula (1), R represents an alkyl group having 1 to 10 carbon atoms. R is an alkyl group preferably having 1 to 8 carbon atoms, more preferably having 1 to 6 carbon atoms, and even more preferably having 1 to 4 carbon atoms.

Preferred examples of R include t-butyl, s-butyl, n-butyl, n-propyl, isopropyl, ethyl, and methyl. R is more preferably ethyl or methyl.

In Formula (1), $Z^1$ represents a single bond, —$NR^1$—, or —O—, and $Z^2$ represents —$NR^1$— or —O—. Here, at least one of $Z^1$ or $Z^2$ is —$NR^1$—. $R^1$ represents a hydrogen atom or an alkyl group having 1 to 10 carbon atoms. $R^1$ is preferably a hydrogen atom or an alkyl group having 1 to 8 carbon atoms, more preferably having 1 to 6 carbon atoms, and even more preferably having 1 to 4 carbon atoms. $R^1$ is more preferably a hydrogen atom, methyl, or ethyl, and even more preferably a hydrogen atom. In a case where $Z^1$ and $Z^2$ both represent —$NR^1$—, two $R^1$'s may be the same as or different from each other.

In Formula (1), L represents an alkylene group having 1 to 10 carbon atoms or —$C_2H_4$—O—$C_2H_4$—.

In a case where L is an alkylene group, the number of carbon atoms thereof is preferably 1 to 8, more preferably 1 to 6, and even more preferably 1 to 4, and the alkylene group is more preferably —$C_2H_4$—.

The compound as the component (a) has only one hydroxyl group in the molecule thereof.

The compound as the component (a) has a log P value (an octanol-water partition coefficient) of equal to or greater than −1.7. Furthermore, as will be described later, there is a specific relationship between the log P value of the component (a) and the SP value of the component (c).

In the present invention, the log P value is determined by the atom fragment method of Ghose, Pritchett, Crippen et al. The method for calculating the log P value by the atom fragment method is described in J. Chem. Inf. Comput. Sci., 1987, 27, pp. 21-35.

It is considered that the compound as the component (a) exerts a curling inhibition effect by permeating a recording medium together with water, blocking water, and preventing the breakage of hydrogen bonds of cellulose. The mechanism is unclear. However, presumably, while the terminal hydroxyl group of the compound is coordinated with cellulose, R as a hydrophobic group blocks water, and hence the above effect is exerted.

In a case where the log P value of the component (a) is smaller than −1.7 or in a case where the component (a) has two or more hydroxyl groups, the component (a) may break hydrogen bonds of cellulose constituting paper as the recording medium, and thus the recording medium may be easily curled after image formation.

The molecular weight of the compound as the component (a) is within a range of 130 to 300. If the molecular weight is less than 130, the component (a) easily volatilizes before permeating the recording medium, and thus the curling inhibition effect is not easily exerted. In a case where the molecular weight is greater than 300, the component (a) does not easily permeate the recording medium, and accordingly, the recording medium is easily curled, and the stacker blocking easily occurs.

The component (a) is more preferably a compound represented by the following Formula (2) or (3).

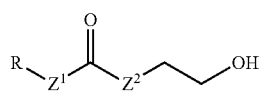

Formula (2)

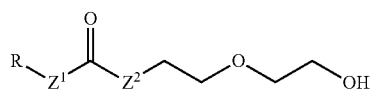

Formula (3)

In Formulae (2) and (3), each of R, $Z^1$, and $Z^2$ has the same definition as R, $Z^1$, and $Z^2$ in Formula (1) described above, and the preferred embodiments thereof are also the same.

The component (a) is even more preferably a compound represented by any one of the following Formulae (4) to (9).

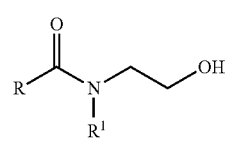

Formula (4)

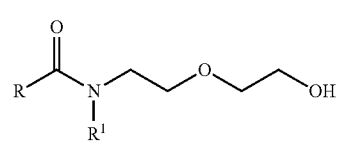

Formula (5)

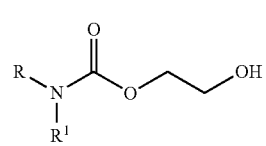

Formula (6)

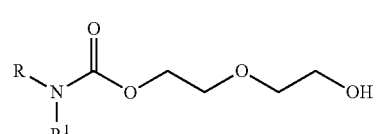

Formula (7)

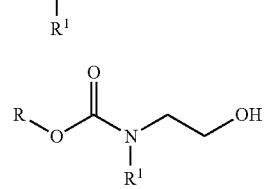

Formula (8)

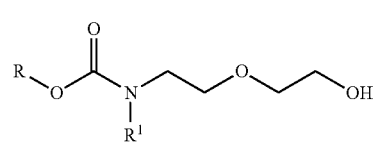

Formula (9)

In Formulae (4) to (9), each of R and $R^1$ has the same definition as R and $R^1$ in Formula (1) described above, and the preferred embodiments thereof are also the same.

Specific examples of the component (a) will be shown below, but the present invention is not limited thereto. In the following examples, "Mw" represents a molecular weight.

(I)

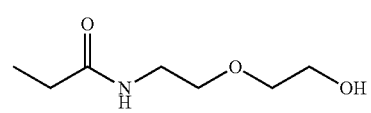

LogP = −0.74,
Mw = 161.20

(II)

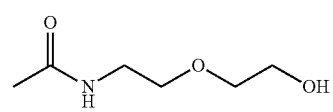

LogP = −1.39
Mw = 147.17

(III)

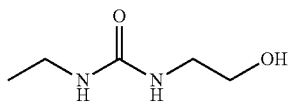

LogP = -0.99
Mw = 132.16

(IV)

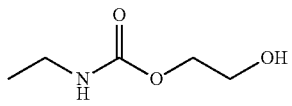

LogP = -0.31
Mw = 133.15

(V)

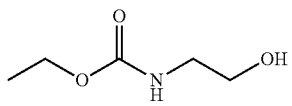

LogP = -0.31
Mw = 133.15

(VI)

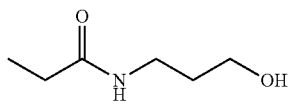

LogP = -0.48
Mw = 131.17

(VII)

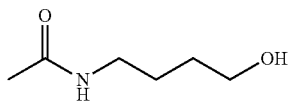

LogP = -0.68
Mw = 145.20

(VIII)

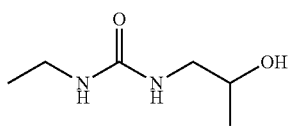

LogP = -0.67
Mw = 146.19

(IX)

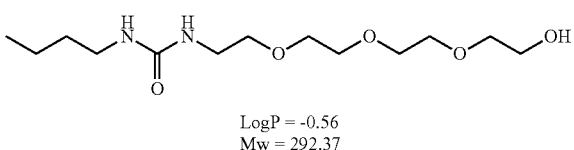

LogP = -0.56
Mw = 292.37

(X)

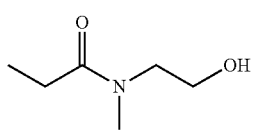

LogP = -0.35
Mw = 131.17

(XI)

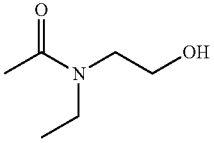

LogP = -0.66
Mw = 131.17

In the ink composition of the present invention, the content of the component (a) is preferably 1% by mass to 35% by mass, and more preferably 1% by mass to 30% by mass.

<Component (b)>

The ink composition of the present invention contains a colorant (component (b)).

The ink composition (hereinafter, simply referred to as an "ink" in some cases) of the present invention can be used not only for forming a monochromic image but also for forming a polychromic image (for example, a full color image). By selecting a single color or two or more colors as desired, an image can be formed. In a case where a full color image is formed, the ink composition can be used as, for example, a magenta tone ink, a cyan tone ink, and a yellow tone ink. Furthermore, the ink composition may be used as a black tone ink.

The ink composition of the present invention can also be used as an ink composition of red (R) tone, green (G) tone, blue (B) tone, and white (W) tone other than the yellow (Y) tone, magenta (M) tone, cyan (C) tone, and black (B) tone, a so-called special color ink composition in the field of printing, or the like.

The ink composition of each color tone described above can be prepared by changing the color of the colorant as desired.

In the ink composition of the present invention, known dyes, pigments, and the like can be used as the colorant without particular limitation. From the viewpoint of the colorability of the formed image, a colorant which is substantially insoluble or poorly soluble in water is preferable. Specifically, examples of the colorant include various pigments, dispersed dyes, oil-soluble dyes, coloring agents forming a J-aggregate, and the like. Considering the light fastness, the colorant is more preferably a pigment.

The type of the pigment used in the ink composition of the present invention is not particularly limited, and general organic or inorganic pigments can be used.

Examples of the organic pigments include an azo pigment, a polycyclic pigment, a dye chelate, a nitro pigment, a nitroso pigment, aniline black, and the like. Among these, an azo pigment, a polycyclic pigment, and the like are more preferable. Examples of the azo pigment include an azo lake, an insoluble azo pigment, a condensed azo pigment, a chelate azo pigment, and the like. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, and the like. Examples of the dye chelate include a basic dye-type chelate, an acidic dye-type chelate, and the like.

Examples of the inorganic pigments include titanium oxide, iron oxide, calcium carbonate, barium sulfate, aluminum hydroxide, barium yellow, cadmium red, chrome yellow, carbon black, and the like. Among these, carbon black is preferable. Examples of the carbon black include those manufactured by a known method such as a contact method, a furnace method, or a thermal method.

Specific examples of the pigments that can be used in the present invention include the pigments described in paragraphs "0142" to "0145" in JP2007-100071A.

In a case where a dye is used as a coloring component in the present invention, a water-insoluble carrier supporting the dye can be used as a colorant. Known dyes can be used as the dye without particular limitation. For example, in the present invention, the dyes described in JP2001-115066A, JP2001-335714A, JP2002-249677A, and the like can also be suitably used. Furthermore, the carrier is not particularly limited as long as it is insoluble or poorly soluble in water. As the carrier, an inorganic material, an organic material, or a composite material of these can be used. Specifically, in the present invention, the carriers described in JP2001-181549A, JP2007-169418A, and the like can also be suitably used.

The carrier (colorant) supporting the dye can be used as it is. Alternatively, if necessary, it can be used concurrently with a dispersant. As the dispersant, a dispersant which will be described later can be suitably used.

One kind of colorant may be used alone. Alternatively, plural kinds of colorant may be selected and used in combination.

From the viewpoint of color density, graininess, ink stability, and jetting reliability, the content of the colorant in the ink composition is preferably 1% by mass to 35% by mass, and more preferably 1% by mass to 25% by mass, with respect to the total mass of the ink composition.

—Dispersant—

In a case where the ink composition of the present invention is aqueous, and the colorant is a pigment, it is preferable that the pigment constitutes coloring particles dispersed in an aqueous medium (hereinafter, simply referred to as "coloring particles") by a dispersant.

The dispersant may be a polymer dispersant or a low-molecular weight surfactant-type dispersant. Furthermore, the polymer dispersant may be any of a water-soluble polymer dispersant and a water-insoluble polymer dispersant.

As the low-molecular weight surfactant-type dispersant, for example, it is possible to use the known low-molecular weight surfactant-type dispersants described in paragraphs "0047" to "0052" in JP2011-178029A.

Examples of the water-soluble polymer dispersant among the above polymer dispersants include hydrophilic polymer compounds. Examples of natural hydrophilic polymer compounds include vegetable polymers such as gum arabic, tragacanth gum, guar gum, karaya gum, locust bean gum, arabinogalactone, pectin, and quince seed starch, seaweed-based polymers such as alginic acid, carrageenan, and agar, animal-based polymers such as gelatin, casein, albumin, and collagen, microorganism-based polymers such as xanthan gum and dextran, and the like.

Examples of hydrophilic polymer compounds obtained by modifying a natural substance as a raw material include cellulose-based polymers such as methylcellulose, ethylcellulose, hydroxyethylcellulose, hydroxypropylcellulose, and carboxymethylcellulose, starch-based polymers such as sodium starch glycolate, sodium starch phosphate ester, seaweed-based polymers such as sodium alginate and alginic acid propylene glycol ester, and the like.

Examples of synthetic hydrophilic polymer compounds include vinyl-based polymers such as polyvinyl alcohol, polyvinyl pyrrolidone, polyvinyl methyl ether; acrylic resins such as non-crosslinked polyacrylamide, polyacrylic acid or an alkali metal salt thereof, and a water-soluble styrene acrylic resin; a water-soluble styrene-maleic acid resin, a water-soluble vinylnaphthalene-acrylic resin, a water-soluble vinylnaphthalene-maleic acid resin, polyvinyl pyrrolidone, polyvinyl alcohol, an alkali metal salt of 0-naphthalene sulfonic acid formalin condensate, a polymer compound having a salt of a cationic functional group such as quaternary ammonium or an amino group on a side chain thereof, a natural polymer compound such as shellac, and the like.

Among the above polymers, hydrophilic polymer compounds into which a carboxyl group is introduced, such as a homopolymer of acrylic acid or methacrylic acid or a copolymer of acrylic acid or methacrylic acid with other monomers, are preferable.

The water-insoluble polymer dispersant is not particularly limited as long as it is a water-insoluble polymer and can disperse a pigment, and a water-insoluble polymer dispersant known in the related art can be used. For example, the water-insoluble polymer dispersant can be constituted with both of a hydrophobic structural unit and a hydrophilic structural unit.

Examples of the monomer component constituting the hydrophobic structural unit include a styrene-based monomer component, an alkyl (meth)acrylate component, an aromatic group-containing (meth)acrylate component, and the like.

The monomer component constituting the hydrophilic structural unit is not particularly limited as long as it is a monomer component containing a hydrophilic group. Examples of the hydrophilic group include a nonionic group, a carboxyl group, a sulfonic acid group, a phosphoric acid group, and the like. Examples of the nonionic group include a hydroxyl group, an amide group (having an unsubstitued nitrogen atom), a group derived from an alkylene oxide polymer (such as polyethylene oxide or polypropylene oxide), a group derived from sugar alcohol, and the like.

From the viewpoint of the dispersion stability, the hydrophilic structural unit preferably contains at least a carboxyl group. It is also preferable that the hydrophilic structural unit contains both the nonionic group and the carboxyl group.

Specific examples of the water-insoluble polymer dispersant include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a styrene-maleic acid copolymer, and the like.

From the viewpoint of the dispersion stability of the pigment, the water-insoluble polymer dispersant is preferably a vinyl polymer containing a carboxyl group, and more preferably a vinyl polymer having at least a structural unit derived from an aromatic group-containing monomer as the hydrophilic structural unit and a structural unit containing a carboxyl group as the hydrophilic structural unit.

From the viewpoint of the dispersion stability of the pigment, the weight average molecular weight of the water-insoluble polymer dispersant is preferably 3,000 to 200,000, more preferably 5,000 to 100,000, even more preferably 5,000 to 80,000, and particularly preferably 10,000 to 60,000.

In the present specification, the weight average molecular weight is measured by gel permeation chromatography (GPC). GPC is performed by using HLC-8220 GPC (manufactured by TOSOH CORPORATION) and using TSKGEL SUPER HZM-H, TSKGEL SUPER HZ4000, and TSKGEL SUPER HZ2000 (manufactured by TOSOH CORPORATION, 4.6 mmID×15 cm) as columns. The conditions of GPC are specifically described in paragraph "0076" of JP2010-155359A.

From the viewpoint of the dispersibility of the pigment, the ink colorability, and the dispersion stability, the content of the dispersant in the coloring particles is preferably 10% by mass to 90% by mass, more preferably 20% by mass to 70% by mass, and particularly preferably 30% by mass to 50% by mass, with respect to 100% by mass of the pigment.

It is preferable that the content of the dispersant in the coloring particles is within the above range, because then the pigment is coated with an appropriate amount of dispersant, and coloring particles which have a small particles size and excellent temporal stability tend to be easily obtained.

For example, the coloring particles can be obtained in the form of a coloring particle dispersion by dispersing a mixture, which contains a pigment, a dispersant, and a solvent (preferably an organic solvent) used if necessary, and the like, by using a disperser.

For example, the coloring particle dispersion can be manufactured in the form of a dispersion by performing a step (mixing—hydrating step) of adding a basic substance-containing aqueous solution to a mixture of the aforementioned pigment, the aforementioned polymer dispersant, and an organic solvent which dissolves or disperses the dispersant, and then performing a step (solvent removing step) of removing the organic solvent. In this way, the colorant is finely dispersed, and a dispersion of coloring particles having excellent preservation stability can be prepared.

The organic solvent needs to be able to dissolve or disperse the dispersant. In addition to this, it is preferable that the organic solvent exhibits affinity with water to some extent. Specifically, at a temperature of 20° C., the content of the organic solvent in water is preferably 10% by mass to 50% by mass.

Preferred examples of the organic solvent include water-soluble organic solvents. Among these, isopropanol, acetone, and methyl ethyl ketone are preferable, and methyl ethyl ketone is particularly preferable. One kind of the organic solvent may be used singly, or plural kinds thereof may be used concurrently.

The aforementioned basic substance is used for neutralizing an anionic group (preferably a carboxyl group) that the polymer has in some cases. A degree of neutralization of the anionic group is not particularly limited. Generally, the finally obtained coloring particle dispersion preferably has liquid properties in which the pH thereof is 4.5 to 10, for example. The pH can be determined by an intended degree of neutralization of the aforementioned polymer.

In the process of manufacturing the coloring particle dispersion, the method for removing the organic solvent is not particularly limited, and a known method such as distillation under reduced pressure can be used.

In the ink composition of the present invention, one kind of the coloring particles may be used singly, or two or more kinds thereof may be used in combination.

In the present invention, the volume average particle size of the colorant (or the coloring particles) is preferably 10 nm to 200 nm, more preferably 10 nm to 150 nm, and even more preferably 10 nm to 100 nm. If the volume average particle size is equal to or less than 200 nm, color reproducibility becomes excellent, and jetting properties become excellent in the case of an ink jet method. If the volume average particle size is equal to or greater than 10 nm, light fastness becomes excellent.

The particle size distribution of the colorant (or the coloring particles) is not particularly limited, and may be wide particle size distribution or monodisperse particle size distribution. Furthermore, two or more kinds of colorant having monodisperse particle size distribution may be used by being mixed together.

The volume average particle size of the colorant (or the coloring particles) can be measured by the same method as used for measuring the volume average particle size of fine polymer particles which will be described later.

<Component (c)>

The ink composition of the present invention contains, as the component (c), a polymer having an SP value of equal to or greater than 17 and equal to or less than 24. The form of the polymer as the component (c) is not particularly limited, but it is preferable that the polymer is in the form of fine polymer particles formed of a polymer having an SP value of equal to or greater than 17 and equal to or less than 24 (hereinafter, simply referred to as "fine polymer particles as the component (c)" or "fine polymer particles" as well).

If the SP value of the polymer as the component (c) is greater than 24, the film quality of the image formed on the recording medium deteriorates, and the stacker blocking easily occurs. It is not preferable that the SP value is less than 17, because then the dispersion stability deteriorates. As will be described later, the SP value of the polymer as the component (c) has a specific relationship with the log P value of the compound as the component (a).

In the present invention, for calculating the SP value, the Okitsu method is employed. The Okitsu method is specifically described in, for example, The Journal of The Adhesion Society of Japan, 1993, Vol. 29, No. 6, p 249~259. The SP value is calculated based on wt % of the monomer component in the polymer as the component (c).

In a case where the polymer as the component (c) has an acidic group, and the polymer as the component (c) is dispersed in the ink composition through the neutralization of the acidic group, the SP value of the polymer before the neutralization is used.

The polymer as the component (c) is present separately from the polymer dispersant constituting the coloring particles described above, and has an effect of improving the fixing properties of the ink composition with respect to the recording medium or the rub resistance of the formed image.

Hereinafter, the embodiment in which the polymer as the component (c) is fine polymer particles will be specifically described.

The fine polymer particles are preferably particles formed of a resin selected from a thermoplastic resin and a thermosetting resin, for example. Furthermore, the fine polymer particles may be particles obtained by further modifying the above particles. Examples of the fine polymer particles include fine particles formed of an acrylic resin, an epoxy resin, a urethane resin, a polyether resin, a polyamide resin, an unsaturated polyester resin, a phenolic resin, a silicone resin, a fluororesin, a polyvinyl resin (example: vinyl chloride, vinyl acetate, polyvinyl alcohol, or polyvinyl butyral), an alkyd resin, a polyester resin (example: a phthalic acid resin), or an amino material (example: a melamine resin, a melamine-formaldehyde resin, an amino-alkyd co-condensation resin, or a urea resin). In addition, the fine polymer particles may be a copolymer containing two or more kinds of structural unit in the polymer constituting the resin described above (in the present specification, a "structural unit" means a single monomer component). Moreover, the fine polymer particles may be constituted with a blend of two or more kinds of resin. The fine polymer particles may also be composite resin particles in which two or more kinds of resin form a core/shell structure, for example.

The fine polymer particles are preferably formed of one kind or two or more kinds of resin selected from an acrylic resin, a urethane resin, a polyether resin, a polyester resin, and a polyolefin resin among the above resins. From the viewpoint of the film quality or the stability, the fine polymer particles are preferably formed of an acrylic resin and/or a urethane resin.

In a case where an image is formed by applying the ink composition onto the recording medium together with a treatment liquid which will be described later, when coming into contact with the treatment liquid or a region formed by drying the treatment liquid, the fine polymer particles are aggregated and increase the viscosity of the ink. In this way, the ink composition is more stably immobilized onto the recording medium. As a result, the rub resistance of the image is further improved, the image unevenness is further inhibited, and the adhesiveness of the ink composition with respect to the recording medium is further improved.

In the ink composition of the present invention, from the viewpoint of improving the rub resistance of the image and inhibiting surface roughening, the glass transition temperature (Tg) of the fine polymer particles is preferably equal to or higher than 40° C. Furthermore, from the viewpoint of the jettability of the ink jet, the upper limit of the glass transition temperature of the fine polymer particles is preferably 250° C.

The glass transition temperature of the fine polymer particles is preferably within a range of equal to or higher than 50° C. and equal to or lower than 230° C.

The glass transition temperature of the fine polymer particles can be appropriately controlled by the method known in the related art. For example, by appropriately adjusting the type or constitutional ratio of monomers used for synthesizing the polymer constituting the fine polymer particles, the molecular weight of the polymer constituting the fine polymer particles, and the like, the glass transition temperature of the fine polymer particles can be controlled within an intended range.

In the present invention, as the glass transition temperature of the fine polymer particles, a measurement Tg obtained by actual measurement is used.

The measurement Tg is measured using, for example, a differential scanning calorimetry (DSC) EXSTAR 6220 manufactured by SII NanoTechnology Inc at a temperature raising rate of 10° C./min. At this time, a temperature at which the base line starts to shift as the fine polymer particles undergo glass transition and a temperature at which the base line returns to the original position are averaged, and the average is taken as the measurement Tg.

Here, in a case where it is not easy to measure the measurement Tg due to the decomposition of the polymer or the like, a calculation Tg calculated by the following equation is adopted. The calculation Tg is calculated by the following equation.

$$1/Tg = \Sigma(X_i/Tg_i)$$

Herein, the polymer as a calculation target is regarded as a copolymer of n kinds of monomer component, and i represents a number of 1 to n. $X_i$ is a weight fraction of an i-th monomer ($\Sigma X_i = 1$), and $Tg_i$ is a glass transition temperature (absolute temperature) of a homopolymer of the i-th monomer. Here, $\Sigma$ represents the sum of i monomers, in which i represents a number of 1 to n. As the value ($Tg_i$) of the glass transition temperature of the homopolymer of each monomer, the values described in Polymer Handbook ($3^{rd}$ Edition) (J. Brandrup, E. H. Immergut (Wiley-Interscience, 1989)) are adopted.

The fine polymer particles are preferably fine polymer particles obtained by a phase-transfer emulsification method, and more preferably particles of the following self-dispersing polymer (self-dispersing polymer particles).

The self-dispersing polymer refers to a water-insoluble polymer which can be in a dispersed state in an aqueous medium by a functional group (particularly, an acidic group or a salt thereof) contained in the polymer when the polymer is put into a dispersed state by a phase-transfer emulsification method in the absence of a surfactant.

Herein, the dispersed state includes both of an emulsified state (emulsion) in which the water-insoluble polymer is dispersed in an aqueous medium in a liquid state and a dispersed state (suspension) in which the water-insoluble polymer is dispersed in an aqueous medium in a solid state.

The term "water-insoluble" means that the amount of the polymer dissolved in 100 parts by mass of water (25° C.) is equal to or less than 5.0 parts by mass.

Examples of the phase-transfer emulsification method include a method in which a polymer is dissolved or dispersed in a solvent (for example, a water-soluble solvent) and then put into water as it is without going through the addition of a surfactant; the resulting solution is stirred and mixed in a state where a salt-generating group (for example, an acidic group) contained in the polymer is neutralized; the solvent is removed; and then an aqueous dispersion in an emulsified or dispersed state is obtained.

Among the self-dispersing polymer particles described in, for example, paragraphs "0090" to "0121" of JP2010-64480A and in paragraphs "0130" to "0167" of JP2011-068085A, those satisfying the specification of the component (c) can be used as the self-dispersing polymer particles used as the component (c) in the present invention.

Next, the acrylic resin suitable for constituting the fine polymer particles will be specifically described. The "acrylic resin" is a resin containing a polymer obtained by polymerizing acrylate, methacrylate, or a derivative thereof as a monomer. The acrylic resin may further contain, as a copolymerization component, styrene, (meth)acrylamide, or a monomer component having a carbon-carbon double bond, such as a derivative of styrene or (meth)acrylamide.

It is preferable that the acrylic resin constituting the fine polymer particles has at least either an aromatic group-containing structural unit or an alicyclic hydrocarbon group-containing structural unit. If the acrylic resin has such a structural unit, the strength of the formed image is enhanced, and the scratch resistance or blocking resistance is improved.

(Aromatic Group-Containing Structural Unit)

The aromatic group-containing structural unit is a structural unit derived from a monomer having an aromatic group (hereinafter, referred to as an aromatic group-containing monomer).

Examples of the aromatic group-containing structural unit include a phenyl group-containing structural unit, a benzyl group-containing structural unit, a phenoxy group-containing structural unit, a phenethyl group-containing structural unit, and the like. Among these, a benzyl group-containing structural unit or a phenoxy group-containing structural unit (preferably a phenoxyethyl group-containing structural unit) is preferable.

The aromatic group-containing monomer is preferably a monomer having an aromatic group derived from aromatic hydrocarbon and an ethylenically unsaturated bond. One kind of the aromatic group-containing monomer may be used singly, or two or more kinds thereof may be used in combination.

Examples of the aromatic group-containing monomer include a (meth)acrylate monomer containing an aromatic group (for example, phenoxyethyl (meth)acrylate, benzyl (meth)acrylate, or phenyl (meth)acrylate), a styrene-based monomer, and the like. Among these, from the viewpoint of the balance between the hydrophilicity and the hydrophobicity of the polymer chain and the ink fixing properties, a (meth)acrylate monomer containing an aromatic group is preferable, at least one kind of monomer selected from phenoxyethyl (meth)acrylate, benzyl (meth)acrylate, and phenyl (meth)acrylate is more preferable, and phenoxyethyl (meth)acrylate and a benzyl (meth)acrylate are even more preferable.

Herein, the "(meth)acrylate" means both of the acrylate and the methacrylate.

(Alicyclic Hydrocarbon Group-Containing Structural Unit)

The alicyclic hydrocarbon group-containing structural unit is a structural unit derived from a monomer having an alicyclic hydrocarbon group (hereinafter, referred to as an "alicyclic hydrocarbon group-containing monomer" as well).

The alicyclic hydrocarbon group-containing monomer is preferably a monomer having an alicyclic hydrocarbon group and an ethylenically unsaturated bond, and more preferably (meth)acrylate having an alicyclic hydrocarbon group (hereinafter, referred to as "alicyclic (meth)acrylate" as well).

The alicyclic (meth)acrylate is a monomer which contains a structural moiety derived from (meth)acrylic acid and a structural moiety derived from an alcohol and has a structure containing at least one substituted or unsubstituted alicyclic hydrocarbon group in the structural moiety derived from an alcohol. The alicyclic hydrocarbon group may be the structural moiety derived from an alcohol or may be bonded to the structural moiety derived from an alcohol through a linking group.

The alicyclic hydrocarbon group is not particularly limited as long as it is a group having a cyclic non-aromatic hydrocarbon structure, and example thereof include a monocyclic hydrocarbon group, a bicyclic hydrocarbon group, a polycyclic hydrocarbon group consisting of three or more rings. Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, and bicyclo[4.3.0]nonane, and the like.

The alicyclic hydrocarbon group may further have a substituent. Examples of the substituent include an alkyl group, an alkenyl group, an aryl group, an aralkyl group, an alkoxy group, a hydroxyl group, a primary amino group, a secondary amino group, a tertiary amino group, an alkyl or arylcarbonyl group, a cyano group, and the like. The alicyclic hydrocarbon group may further form a fused ring. In the present invention, from the viewpoint of the viscosity or solubility, the number of carbon atoms of the alicyclic hydrocarbon moiety of the alicyclic hydrocarbon group is preferably 5 to 20.

Specific examples of the alicyclic (meth)acrylate will be shown below, but the present invention is not limited thereto.

As monocyclic (meth)acrylate, cycloalkyl (meth)acrylate having 3 to 10 carbon atoms is preferable, and examples thereof include cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, cyclodecyl (meth)acrylate, and the like.

Examples of bicyclic (meth)acrylate include isobornyl (meth)acrylate, norbornyl (meth)acrylate, and the like.

Examples of tricyclic (meth)acrylate include adamantyl (meth)acrylate, dicyclopentanyl (meth)acrylate, dicyclopentenyloxyethyl (meth)acrylate, and the like.

One kind of these can be used singly, or two or more kinds thereof can be used by being mixed together.

From the viewpoint of the dispersion stability of the fine polymer particles, fixing properties, and blocking resistance, the acrylic resin preferably contains, as a monomer component, a polycyclic (meth)acrylate component consisting of two or more rings among the above monomers, and more preferably contains at least one kind of component selected from an isobornyl (meth)acrylate component, an adamantyl (meth)acrylate component, and a dicyclopentanyl (meth)acrylate component.

In the acrylic resin constituting the fine polymer particles, the total content of the aromatic group-containing structural unit and the alicyclic hydrocarbon group-containing structural unit in the polymer is preferably 3% by mass to 95% by mass, more preferably 5% by mass to 75% by mass, and particularly preferably 10% by mass to 50% by mass. If the total content is within the above range, the stability of the self-emulsified or self-dispersed state can be improved, and the increase in the ink viscosity can be inhibited.

Considering the removability (maintenance properties) of the ink composition from a nozzle or the re-jettability after the removal, the acrylic resin constituting the fine polymer particles more preferably has the aromatic group-containing structural unit.

The fine polymer particles are more preferably in such an embodiment that the acrylic resin constituting the fine polymer particles contains the aromatic group-containing structural unit (monomer component) in the polymer thereof, and the content of the aromatic group-containing structural unit is 3% by mass to 45% by mass (more preferably 3% by mass to 40% by mass and particularly preferably 5% by mass to 30% by mass) with respect to the total amount of the polymer.

If the fine polymer particles are in such an embodiment, it becomes easier to adjust the glass transition temperature of the fine polymer particles to be equal to or higher than 40° C.

From the viewpoint of the dispersibility (self-dispersibility in a case where the fine polymer particles are self-dispersing polymer particles) in the ink composition, the acrylic resin constituting the fine polymer particles preferably contain a hydrophilic structural unit.

(Hydrophilic Structural Unit)

The hydrophilic structural unit is a structural unit derived from a monomer having a hydrophilic group (hereinafter, referred to as a "hydrophilic group-containing monomer" as well).

In this case, the hydrophilic structural unit in the polymer is derived from one kind or two or more kinds of hydrophilic group-containing monomer.

The hydrophilic group is not particularly limited, and may be a dissociative group or a nonionic hydrophilic group.

From the viewpoint of promoting self-dispersion and the stability of the emulsified or dispersed state created, the hydrophilic group is preferably a dissociative group, and more preferably an anionic dissociative group. Examples of the dissociative group include a carboxyl group, a phosphoric acid group, a sulfonic acid group, and the like. Among these, from the viewpoint of the fixing properties in a case where the dissociative group constitutes the ink composition, a carboxyl group is preferable.

From the viewpoint of the self-dispersibility and aggregating properties, the hydrophilic group-containing monomer is preferably a dissociative group-containing monomer, and more preferably a dissociative group-containing monomer having a dissociative group and an ethylenically unsaturated bond.

Examples of the dissociative group-containing monomer include an unsaturated carboxylic acid monomer, an unsaturated sulfonic acid monomer, an unsaturated phosphoric acid monomer, and the like.

Specific examples of the unsaturated carboxylic acid monomer include (meth)acrylic acid, crotonic acid, itaconic acid, maleic acid, fumaric acid, citraconic acid, 2-methacryloyloxymethyl succinic acid, and the like.

Specific examples of the unsaturated sulfonic acid monomer include styrene sulfonic acid, 2-acrylamide-2-methylpropanesulfonic acid, 3-sulfopropyl (meth)acrylate, bis-(3-sulfopropyl)-itaconic acid ester, and the like.

Specific examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, dibutyl 2-acryloyloxyethyl phosphate, and the like.

Among the dissociative group-containing monomers, from the viewpoint of the dispersion stability and the jetting stability, an unsaturated carboxylic acid monomer is preferable, and (meth)acrylic acid is more preferable.

In the acrylic resin constituting the fine polymer particles, the content of the hydrophilic structural unit in the polymer is not particularly limited. However, from the viewpoint of the dispersion stability, the content of the hydrophilic structural unit is preferably 2% by mass to 30% by mass, more preferably 5% by mass to 20% by mass, and particularly preferably 5% by mass to 15% by mass, with respect to the total amount of the polymer.

From the viewpoint of the flexibility of the polymer skeleton and the ease of controlling the glass transition temperature (Tg), it is preferable that the acrylic resin constituting the fine polymer particles contains an alkyl group-containing structural unit in the polymer.

(Alkyl Group-Containing Structural Unit)

In the alkyl group-containing structural unit, the number of carbon atoms of the alkyl group is preferably 1 to 4.

The alkyl group-containing structural unit is a structural unit derived from a monomer having an alkyl group (hereinafter, referred to as an "alkyl group-containing monomer" as well).

Examples of the alkyl group-containing monomer include alkyl group (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; ethylenically unsaturated monomers having a hydroxyalkl group, such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate; dialkylaminoalkyl (meth)acrylate such as dimethylaminoethyl (meth)acrylate; N-hydroxyalkyl (meth)acrylamide such as N-hydroxymethyl (meth)acrylamide, N-hydroxyethyl (meth)acrylamide, and N-hydroxybutyl (meth)acrylamide; N-alkoxyalkyl (meth)acrylamide such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, and N-(n-, iso)butoxyethyl (meth)acrylamide, and the like.

Among these, alkyl (meth)acrylate is preferable, alkyl (meth)acrylate in which the alkyl group has 1 to 4 carbon atoms is more preferable, methyl (meth)acrylate or ethyl (meth)acrylate is even more preferable, and methyl (meth)acrylate is particularly preferable.

In the acrylic resin constituting the fine polymer particles, the content of the alkyl group-containing structural unit in the polymer is not particularly limited. However, from the viewpoint of the dispersion stability, the content of the alkyl group-containing structural unit is preferably 5% by mass to 90% by mass, more preferably 10% by mass to 85% by mass, even more preferably 20% by mass to 80% by mass, particularly preferably 30% by mass to 75% by mass, and most preferably 40% by mass to 75% by mass, with respect to the total amount of the polymer.

The weight average molecular weight of the polymer of the acrylic resin constituting the fine polymer particles is preferably 3,000 to 200,000, more preferably 5,000 to 150,000, and even more preferably 10,000 to 100,000.

If necessary, the polymer constituting the fine polymer particles may contain a structural unit other than the aforementioned structural units.

In the present invention, it is also preferable that the fine polymer particles are formed of a urethane resin.

The urethane resin is formed of a urethane moiety which can cause a strong interaction such as hydrogen bonding between polymers and a non-urethane moiety which causes a relatively weak interaction between polymers. Presumably, when a film of ink is formed, the urethane resin constructs, as a microstructure, a sea-island structure in which the moieties having a relatively strong interaction and the moieties having a relatively weak interaction are gathered respectively, and thus the urethane resin has flexibility. Presumably, because the urethane resin inherently has flexibility as described above, the formed film is flexible and can release the stress, and hence an ink image having excellent rub resistance can be formed.

The urethane resin used for forming the fine polymer particles in the present invention can be obtained by, for example, causing a polymerization reaction between a diol compound and a diisocyanate compound. Regarding the details of the diol compound and the diisocyanate compound, for example, the description of paragraphs "0031" to "0036" in JP2001-247787A can be referred to. Among the urethane resins, it is preferable to use a polyester-based urethane resin or a polyether-based urethane resin having an ester bond or an ether bond in the main chain structure thereof.

The diisocyanate compound is not particularly limited, and examples thereof include aliphatic diisocyanate compounds such as hexamethylene diisocyanate and 2,2,4-trimethyl hexamethylene diisocyanate; alicyclic diisocyanate compounds such as isophorone diisocyanate, 1,4-cyclohexane diisocyanate, and 4,4'-dicyclohexylmethane diisocyanate; aromatic diisocyanate compounds such as xylylene diisocyanate, tetramethylxylene diisocyanate, tolylene diisocyanate, and phenylmethane diisocyanate; and the like. One kind of these diisocyanate compounds may be used singly, or two or more kinds thereof may be used concurrently.

The diol compound is not particularly limited, and examples thereof include a polyether diol compound obtained by polymerizing alkylene oxide such as ethylene oxide, propylene oxide, or butylenes oxide or a heterocyclic ether such as tetrahydrofuran. The polyether diol compound may be a homopolymer or a copolymer. Specific examples of the polyether diol compound include polyether diol such as polyethylene glycol, polypropylene glycol, polybutylene oxide, polytetramethylene ether glycol, and polyhexamethylene ether glycol; polyester diol such as polyethylene adipate, polybutylene adipate, polyneopentylene adipate, poly-3-methyl pentylene adipate, polyethylene/butylene adipate, and polyneopentyl/hexyl adipate; polylactone diol such as polycaprolactone diol, polyvalerolactone diol, and polycaprolactone/polyvalerolactone diol; and polycarbonate diol such as polyalkylene carbonate. Among these, polyether diol and polycarbonate diol are preferable, and polyalkylene carbonate diol (example: polyethylene carbonate diol, polypropylene carbonate diol, polybutylene carbonate diol, polypentylene carbonate diol, and polyhexylene carbonate diol) is particularly preferable.

It is preferable to improve the hydrophilicity by concurrently using a carboxylic acid group-containing diol compound as a diol compound. Examples of the carboxylic acid group-containing diol compound include dimethylolacetic acid, dimethylolpropionic acid, and dimethylolbutanoic acid, and among these, dimethylolpropionic acid is particularly preferable.

The form of the urethane resin constituting the fine polymer particles is not particularly limited. As a typical form thereof, an emulsion type such as a self-emulsifying emulsion and a self-stabilizing type are exemplified. Particularly, examples of the compound constituting urethane include a urethane resin using a diol compound having an acidic group such as a carboxylic acid group, or a sulfonic acid group, a urethane resin obtained by adding a low-molecular weight polyhydroxy compound as a raw material, and a urethane resin into which an acidic group is introduced. Among these, a urethane resin having a carboxyl group is desirable.

From the viewpoint of the rub resistance and the preservation stability of the ink, the weight average molecular weight of the polymer of the urethane resin is preferably 5,000 to 200,000, and more preferably 8,000 to 30,000.

The acid value of the urethane resin is not particularly limited, and is preferably equal to or greater than 5 mgKOH/g and equal to or less than 100 mgKOH/g, and particularly preferably equal to or greater than 10 mgKOH/g and equal to or less than 80 mgKOH/g.

As the urethane resin, synthetic urethane resins synthesized by known synthesis methods or commercially available products can be used.

The commercially available products are not particularly limited as long as they are urethane resins, and among these, a polyester-based urethane resin or a polyether-based urethane resin is preferably used. Examples thereof include NEOREZ R-960 (manufactured by Lubrizol Japan Limited), NEOREZ R-989 (manufactured by Lubrizol Japan Limited), NEOREZ R-9320 (manufactured by Lubrizol Japan Limited), NEORAD NR-440 (manufactured by Lubrizol Japan Limited), HYDRAN AP-30 (manufactured by DIC Corporation), HYDRAN APX-601 (manufactured by DIC Corporation), HYDRAN SP-510 (manufactured by DIC Corporation), HYDRAN SP-97 (manufactured by DIC Corporation), HYDRAN HW140 (manufactured by DIC Corporation), TAKELAC W-5025 (manufactured by Mitsui Takeda Chemicals Inc.), ELASTRON MF-60 (manufactured by DAI-ICHI KOGYO SEIYAKU CO., LTD.), ELASTRON MF-9 (manufactured by DAI-ICHI KOGYO SEIYAKU CO., LTD.), M-1064 (manufactured by DAI-ICHI KOGYO SEIYAKU CO., LTD.), IZELAX 5-1020 (manufactured by Hodogaya Chemical Co., Ltd.), IZELAX 5-1040 (manufactured by Hodogaya Chemical Co., Ltd.), IZELAX 5-1085C (manufactured by Hodogaya Chemical Co., Ltd.), IZELAX 5-4040N (manufactured by Hodogaya Chemical Co., Ltd.), NEOTAN UE-5000 (manufactured by TOAGOSEI CO., LTD.), an RU-40 series (manufactured by Style Japan Co., Ltd.), UCOAT UWS-145 (manufactured by Sanyo Chemical Industries, Ltd.), PERMARIN UA-150 (manufactured by Sanyo Chemical Industries, Ltd.), a WF-41 series (manufactured by Style Japan Co., Ltd.), WPC-101 (manufactured by Nippon Polyurethane Industry Co., Ltd.), ACRIT WBR-016U, WEM-321U, WBR-2018, WBR-2000U, WBR-601U, and WBR-2101 (manufactured by TAISEI FINE CHAMEICAL CO., LTD.).

Specific examples of the urethane resin that can constitute the fine particles as the component (c) will be shown below, but the present invention is not limited thereto.

B-1) A salt of reactants isophorone diisocyanate/polycarbonate diol (DURANOL T5661, manufactured by Asahi Kasei Chemicals Corporation.)/dimethylolpropionic acid that is partially neutralized with sodium hydroxide B-2) A salt of reactants dicyclohexylmethane-4,4'-diisocyanate/polycarbonate diol (DURANOL T5660, manufactured by Asahi Kasei Chemicals Corporation.)/dimethylolpropionic acid that is partially neutralized with sodium hydroxide B-3) A salt of reactants isophorone diisocyanate/polycarbonate diol (DURANOL T5661, manufactured by Asahi Kasei Chemicals Corporation.)/dimethylolpropionic acid that is partially neutralized with triethylamine B-4) A salt of reactants xylylene diisocyanate/polycarbonate diol (DURANOL T5661, manufactured by Asahi Kasei Chemicals Corporation.)/dimethylolpropionic acid that is partially neutralized with sodium hydroxide B-5) A salt of reactants isophorone diisocyanate/polyethylene glycol (molecular weight 300, manufactured by Wako Pure Chemical Industries, Ltd.)/dimethylolpropionic acid that is partially neutralized with sodium hydroxide B-6) A salt of reactants isophorone diisocyanate/ethylene glycol/dimethylolpropionic acid that is partially neutralized with sodium hydroxide B-7) A salt of reactants isophorone diisocyanate/polypropylene glycol/dimethylolpropionic acid that is partially neutralized with sodium hydroxide.

B-8) A salt of reactants dicyclohexylmethane-4,4'-diisocyanate/1,2-butanediol/dimethylolpropionic acid that is partially neutralized with sodium hydroxide The molecular weight of the polymer constituting the fine polymer particles is preferably within a range of 3,000 to 200,000, more preferably within a range of 5,000 to 150,000, and even more preferably within a range of 10,000 to 100,000, in terms of a weight average molecular weight. If the weight average molecular weight is equal to or greater than 3,000, the amount of water-soluble component can be effectively reduced. If the weight average molecular weight is equal to or less than 200,000, the self-dispersion stability can be improved.

From the viewpoint of the self-dispersibility and the aggregation speed at the time when the fine polymer particles come into contact with the treatment liquid, the fine polymer particles are preferably a fine polymer particles having an acid value of equal to or less than 100 mgKOH/g, and more preferably a polymer having an acid value of 25 mgKOH/g to 100 mgKOH/g.

The average particle size of the fine polymer particles is preferably within a range of 1 nm to 400 nm, more preferably within a range of 1 nm to 200 nm, even more preferably within a range of 1 nm to 100 nm, and particularly preferably within a range of 1 nm to 50 nm, in terms of a volume average particle size. If the volume average particle size is equal to or greater than 1 nm, the manufacturing suitability is improved, and if the volume average particle size is equal to or less than 400 nm, the preservation stability is improved. The particle size distribution of the polymer particles is not particularly limited, and may be wide particle size distribution or monodisperse particle size distribution. Furthermore, two or more kinds of fine polymer particles may be used by being mixed together. The volume average particle size can be measured by a dynamic light scattering method using a MICROTRAC particle size distribution analyzer (trade name: VERSION 10.1.2-211BH, manufactured by NIKKISO CO., LTD.).

The content of the fine polymer particles (preferably self-dispersing polymer particles) as the component (c) described above in the ink composition (total content in a case where two or more kinds of fine polymer particles are used) is not particularly limited. The content of the fine polymer particles is preferably 0.3% by mass to 15.0% by mass, more preferably 1.0% by mass to 12.0% by mass, even more preferably 2.0% by mass to 10.0% by mass, and still more preferably 5.0% by mass to 10.0% by mass, with respect to the total amount of the ink composition.

If the content is equal to or greater than 0.3% by mass, the rub resistance of the image can be further improved, and the image unevenness can be further inhibited.

It is advantageous for the content to be equal to or less than 15.0% by mass, because then the jettability of the ink can be further improved, and the generation of precipitate in a low-temperature environment can be inhibited.

(Relationship between log P value of component (a) and SP value of component (c))

In the ink composition of the present invention, the log P value of the component (a) and the SP value of the component (c) satisfies the following Expression I.

$$-1.7 \leq [\log P \text{ value of component}(a)] \leq -0.0456 \times [SP \text{ value of component}(c)] + 0.6319 \quad \text{[Expression I]}$$

In a case where the above Expression I is satisfied, the occurrence of stacker blocking and curling can be effectively inhibited. The mechanism is unclear but is assumed to be as below.

That is, presumably, in a case where the Expression I is satisfied, the compatibility between the compound as the component (a) and the polymer as the component (c) is low, and the compound as the component (a) acts as a plasticizer on the polymer as the component (c), and hence the stacker blocking can be effectively inhibited. Furthermore, presumably, due to the low compatibility between the compound as the component (a) and the polymer as the component (c) is low, when the ink composition is jetted onto a recording medium, the compound as the component (a) is not easily adsorbed onto the polymer as the component (c) and can effectively permeate the recording medium, and as a result, water is inhibited from breaking hydrogen bonds of cellulose, and the recording medium is not easily curled.

In contrast, presumably, in a case where the Expression I is not satisfied, the compatibility between the compound as the component (a) and the polymer as the component (c) is increased, and hence the compound as the component (a) is easily adsorbed onto the polymer as the component (c). In this case, while the permeation of the compound as the component (a) into the recording medium is hindered, the permeation of water into the recording medium occurs efficiently, and thus the recording medium is easily curled. In addition, presumably, the compound as the component (a) adsorbed onto the polymer as the component (c) acts as a plasticizer on the fine polymer particles as the component (c), and hence the stacker blocking easily occurs.

In order to more effectively inhibit both of the curling and the stacker blocking, the ratio between the content of the compound as the component (a) and the content of the polymer as the component (c) in the ink composition of the present invention is preferably 1:8 to 4:1 (component (a):component (c)), and more preferably 1:4 to 2:1, in terms of a mass ratio (solid content)

<Component (d)>

The ink composition of the present invention contains water as a component (d).

The water used in the ink composition of the present invention is preferably water not containing ionic impurities, such as deionized water or distilled water.

The content of water in the ink composition can be appropriately selected according to the purpose. Generally, the content of water in the ink composition is preferably 20% by mass to 90% by mass, more preferably 30% by mass to 80% by mass, and even more preferably 40% by mass to 80% by mass.

In the ink composition of the present invention, the relationship between the content of the compound as the component (a) and the content of water as the component (d) preferably satisfies component (a)/component (d)=0.01 to 1.1, and more preferably satisfies 0.01 to 0.7, in terms of a mass ratio.

<Component (e)>

The ink composition of the present invention preferably contains a water-soluble organic compound as a component (e) so as to adjust the viscosity of the ink composition. Herein, the term "water-soluble" means that the compound is dissolved in an amount of equal to or greater than 5% by mass in 100 g of water at 25° C.

Examples of the water-soluble organic compound include an alcohol, ketone, an ether compound, an amide compound, a nitrile compound, and a sulfone compound. Examples of the alcohol include ethanol, isopropanol, n-butanol, t-butanol, isobutanol, diacetone alcohol, and ethylene glycol. Examples of the ketone include acetone, methyl ethyl ketone, diethyl ketone, and methyl isobutyl ketone. Examples of the ether compound include dibutyl ether, tetrahydrofuran, and dioxane. Examples of the amide compound include dimethylformamide and diethylformamide Examples of the nitrile compound include acetonitrile. Examples of the sulfone compound include dimethyl sulfoxide, dimethyl sulfone, sulfolane, and the like.

The ink composition of the present invention may contain a surfactant as the water-soluble organic compound. The surfactant functions as a surface tension adjuster.

As the surfactant, any of an anionic surfactant, a cationic surfactant, an amphoteric surfactant, a nonionic surfactant, a betaine-based surfactant can be used.

Specific examples of the anionic surfactant include sodium dodecylbenzenesulfonate, sodium lauryl sulfate, sodium alkyl diphenyl ether disulfonate, sodium alkyl naphthalene sulfonate, sodium dialkyl sulfosuccinate, sodium stearate, potassium oleate, sodium dioctylsulfosuccinate, sodium polyoxyethylene alkyl ether sulfate, sodium polyoxyethylene alkyl ether sulfate, sodium polyoxyethylene alkyl phenyl ether sulfate, sodium dialkyl sulfosuccinate, sodium oleate, a sodium t-octylphenoxyethoxypolyethoxyethyl sulfate salt, and the like. One kind of surfactant or two or more kinds of surfactant can be selected from these.

Specific examples of the nonionic surfactant include an acetylene diol derivative such as an ethylene oxide adduct of acetylene diol, polyoxyethylene lauryl ether, polyoxyethylene octylphenyl ether, polyoxyethylene oleyl phenyl ether, polyoxyethylene nonylphenyl ether, an oxyethylene-oxypropylene block copolymer, t-octyl phenoxyethyl polyethoxy ethanol, nonyl phenoxyethyl polyethoxy ethanol, and the like. One kind of surfactant or two or more kinds of surfactant can be selected from these.

Examples of the cationic surfactant include a tetraalkyl ammonium salt, an alkyl amine salt, a benzalkonium salt, an alkylpyridium salt, an imidazolium salt, and the like. Specific examples thereof include dihydroxyethyl stearylamine, 2-heptadecenyl-hydroxyethyl imidazoline, lauryl dimethyl benzyl ammonium chloride, cetylpyridinium chloride, stearamide methyl pyridium chloride, and the like.

Among these surfactants, from the viewpoint of the stability, a nonionic surfactant is preferable, and an acetylene diol derivative is more preferable.

In a case where the ink composition of the present invention is used in an ink jet recording method, from the viewpoint of excellently jetting the ink composition, the amount of the surfactant is preferably adjusted such that the surface tension of the ink composition becomes 20 mN/m to 60 mN/m, more preferably adjusted such that the surface tension becomes 20 mN/m to 45 mN/m, and even more preferably adjusted such that the surface tension becomes 25 mN/m to 40 mN/m.

The surface tension of the ink composition is measured using an automatic surface tensiometer CBVP-Z (manufactured by Kyowa Interface Science Co., LTD.) under a condition of 25° C.

The content of the surfactant in the ink composition is preferably a such an amount that enables the surface tension of the ink composition to fall into the aforementioned range. More specifically, the content of the surfactant in the ink composition is preferably equal to or greater than 0.1% by mass, more preferably 1% by mass to 10% by mass, and even more preferably 1% by mass to 3% by mass.

The content of the component (e) in the ink composition of the present invention is appropriately selected according to the purpose. The content of the component (e) in the ink composition of the present invention is preferably 0% by mass to 50% by mass in general, more preferably 0.1% by mass to 45% by mass, and even more preferably 1% by mass to 40% by mass.

<Physical Properties of Ink Composition>

The viscosity at a temperature of 25° C. of the ink composition of the present invention is preferably equal to or greater than 1.2 mPa·s and equal to or less than 15.0 mPa·s, more preferably equal to or greater than 2 mPa·s and less than 13 mPa·s, and even more preferably equal to or greater than 2.5 mPa·s and less than 10 mPa·s.

The viscosity of the ink composition is measured using a VISCOMETER TV-22 (manufactured by TOKI SANGYO CO., LTD.) under a condition of 25° C.

From the viewpoint of the stability of the ink composition, the pH of the ink composition is preferably 6 to 11. In a case where the ink composition is contained in the ink set which will be described later, it is preferable that the ink composition is rapidly aggregated by coming into contact with the treatment liquid. Therefore, the pH of the ink composition is more preferably 7 to 10, and even more preferably 7 to 9.

[Ink Set]

The ink set of the present invention contains at least a part of the ink composition described above and an acid treatment agent which can form an aggregate by coming into contact with the ink composition. Furthermore, the ink set of the present invention may contain a maintenance liquid used for removing the ink composition stuck to an ink jet recording head (for example, dried and solidified ink solid).

If the ink composition and the acid treatment agent are used for forming an image, it is possible to form a high-quality image having excellent curing sensitivity and blocking resistance.

Hereinafter, the acid treatment agent constituting the ink set will be described.

<Acid Treatment Agent>

The acid treatment agent constituting the ink set contains at least an acidic compound, and if necessary, the acid treatment agent further contains other components. Examples of other components include a water-soluble organic solvent and a cationic polymer.

The cationic polymer is preferably a homopolymer of a cationic monomer having primary to tertiary amino groups or a quaternary ammonium salt group as a cationic group or those obtained as a copolymer or a condensed polymer of the above cationic monomer and a non-cationic monomer. The cationic polymer may be used in any form such as a water-soluble polymer or water-dispersible latex particles. Examples of the cationic polymer include one kind or two or more kinds among a poly(vinylpyridine) salt, polyalkylaminoethyl acrylate, polyalkylaminoethyl methacrylate, poly(vinylimidazole), polyethyleneimine, polybiguanide, polyguanide, and a copolymer including an epihalohydrin derivative and an amine derivative.

The acid treatment agent used in the present invention is generally an aqueous solution.

(Acidic Compound)

The acidic compound used in the acid treatment agent can cause the aggregation (immobilization) of the ink composition by coming into contact with the ink composition on a recording medium, and functions as an immobilization agent. For example, if the ink composition droplets are caused to land on a recording medium (preferably coated paper) to which the acid treatment agent has been applied, the components in the ink composition can be aggregated, and the ink composition can be immobilized onto the recording medium.

Furthermore, by applying the acid treatment agent to the recording medium in advance, the polymerization efficiency of the ink composition droplets landing on the recording medium can be improved.

Examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxalic acid, acetic acid, and benzoic acid. From the viewpoint accomplishing both of the inhibition of volatilization and the solubility in the solvent, the acidic compound is preferably an acid having a molecular weight of equal to or greater than 35 and equal to or less than 1,000, more preferably an acid having a molecular weight of equal to or greater than 50 and equal to or less than 500, and particularly preferably an acid having a molecular weight of equal to or greater than 50 and equal to or less than 200. In addition, from the viewpoint of accomplishing both of the prevention of blurring of the ink and the photocuring properties, the acidic compound is preferably an acid having a pKa value (in $H_2O$, 25° C.) of equal to or greater than −10 and equal to or less than 7, more preferably an acid having a pKa value of equal to or greater than 1 and equal to or less than 7, and particularly preferably an acid having a pKa value of equal to or greater than 1 and equal to or less than 5.

Among the above acids, an acid having high water solubility is preferable. Furthermore, from the viewpoint of immobilizing the entirety of the ink by reacting with the ink composition, an acid having a valency of equal to or less than 3 is preferable, and a divalent or trivalent acid is particularly preferable.

In the present invention, one kind of acidic compound may be used singly, or two or more kinds thereof may be used concurrently.

In a case where the acid treatment agent is an aqueous solution, the pH (25° C.) of the acid treatment agent is preferably 0.1 to 6.8, more preferably 0.1 to 6.0, and even more preferably 0.1 to 5.0.

The content of the acidic compound in the acid treatment agent is preferably equal to or less than 40% by mass, more preferably 15% by mass to 40% by mass, even more preferably 15% by mass to 35% by mass, and particularly preferably 20% by mass to 30% by mass. If the content of the acidic compound in the acid treatment agent is 15% by mass to 40% by mass, the components in the ink composition can be more efficiently immobilized.

The amount of the acidic compound applied to the recording medium is not particularly limited as long as the amount is enough for causing the aggregation of the ink composition. From the viewpoint of making it easy to immobilize the ink composition, the amount of the acidic compound applied is preferably 0.5 g/m² to 4.0 g/m², and more preferably 0.9 g/m² to 3.75 g/m².

[Ink Jet Recording Method]

By jetting the ink composition of the present invention onto a recording medium by an ink jet method, an image can be formed on the recording medium. It is preferable that the ink jet recording method includes at least an acid treatment step (treatment liquid applying step) of applying the acid treatment agent as a part of the ink set described above onto a recording medium, and an ink applying step of jetting the ink composition onto the recording medium by an ink jet method such that an image is formed.

<Recording Medium>

The recording medium used in the ink jet recording method of the present invention is not particularly limited, but is preferably a paper medium. That is, it is possible to use general printing paper which is used in general offset printing or the like and mainly composed of cellulose, such as so-called fine paper, coated paper, and art paper.

As the recording medium, commercially available general recording media can be used. Examples of the recording media include fine paper (A) such as "OK PRINCE FINE" manufactured by Oji Paper Co., Ltd., "SHIRAOI" manufactured by NIPPON PAPER INDUSTRIES CO., LTD., and "NEW NIP FINE" manufactured by NIPPON PAPER INDUSTRIES CO., LTD., fine coated paper such as "SILVERDIA" manufactured by NIPPON PAPER INDUSTRIES CO., LTD., lightly coated paper such as "OK EVERLIGHT COAT" manufactured by Oji Paper Co., Ltd. and "AURORA S" manufactured by NIPPON PAPER INDUSTRIES CO., LTD., lightweight coated paper (A3) such as "OK COAT L" manufactured by Oji Paper Co., Ltd. and "AURORA L" manufactured by NIPPON PAPER INDUSTRIES CO., LTD., coated paper (A2, B2) such as "OK TOPCOAT +" manufactured by Oji Paper Co., Ltd. and "AURORA COAT" manufactured by NIPPON PAPER INDUSTRIES CO., LTD., art paper (A1) such as "OK KINFUJI+" manufactured by Oji Paper Co., Ltd. and "TOKUBISHI ART" manufactured by MITSUIBISHI PAPER MILLS LIMITED., and the like. Furthermore, various exclusive papers for photograph for ink jet recording can also be used.

Among the recording media, so-called coated paper used in general offset printing or the like is preferable. The coated paper is obtained by forming a coat layer on the surface of fine paper or neutral paper, which is mainly composed of cellulose and generally has not undergone surface treatment, by coating the surface thereof with a coating material. When an image is formed on the coated paper by using a general aqueous ink jet, the image quality such as gloss or abrasion resistance easily becomes problematic. However, when the aforementioned ink composition or ink set is used, gloss unevenness is suppressed, and as a result, an image having excellent gloss and abrasion resistance can be obtained. It is particularly preferable to use coated paper including base paper and a coat layer containing either or both of kaolin and calcium bicarbonate. More specifically, art paper, coated paper, lightweight coated paper, and fine coated paper are more preferable.

A water absorption coefficient Ka of the above recording media is preferably 0.05 $mL/m^2 \cdot ms^{1/2}$ to 0.5 $mL/m^2 \cdot ms^{1/2}$, more preferably 0.1 $mL/m^2 \cdot ms^{1/2}$ to 0.4 $mL/m^2 \cdot ms^{1/2}$, and even more preferably 0.2 $mL/m^2 \cdot ms^{1/2}$ to 0.3 $mL/m^2 \cdot ms^{1/2}$, because within the above range, the effect of inhibiting the migration of coloring materials becomes strong, and a high-quality image is obtained which has excellent color density and color better than those of the related art.

The water absorption coefficient Ka has the same definition as the absorption coefficient described in JAPAN TAPPI paper pulp test method No. 51:2000 (published from Japan Tappi.). Specifically, by using an automatic scanning liquid absorptometer KM500WIN (manufactured by KUMAGAI RIKI KOGYO Co., Ltd.), the amount of water transferred to a medium is measured under conditions of a contact time of 100 ms and a contact time of 900 ms, and from a difference therebetween, the water absorption coefficient Ka is calculated.

<Acid Treatment Step>

In the acid treatment step, the acid treatment agent contained in the ink set is applied onto a recording medium. For applying the acid treatment agent (aqueous solution) to the recording medium, a known liquid applying method can be used without particular limitation, and it is possible to select any method such as coating like spray coating or roller coating, a method of applying the acid treatment agent by using an ink jet method, or dipping.

Specifically, examples of the method include a size press method represented by a horizontal size press method, a roll coater method, a calendar size press method, or the like; a size press method represented by an air knife coater method or the like; a knife coater method represented by an air knife coater method or the like; a roll coater method represented by a transfer roll coater method such as gate roll coater method, a direct roll coater method, a reverse roll coater method, a squeeze roll coater method, or the like; a building blade coater method; a short dwell coater method; a blade coater method represented by a two stream coater method or the like; a bar coater method represented by a rod bar coater method or the like; a cast coater method; gravure coater method; a curtain coater method; a die coater method, a brush coater method; a transfer method; and the like.

Furthermore, a coating method may be used in which the coating amount is controlled using a coating device that includes a liquid amount restricting member just like the coating device described in JP1998-230201A (JP-H10-230291A).

Regarding a region to which the acid treatment agent is applied, the acid treatment agent may be applied to the entire surface of the recording medium such that the agent is applied to the entirety of the recording medium, or alternatively, the acid treatment agent may be partially applied such that it is applied to a region to which the ink has been applied in the ink applying step. In the present invention, it is preferable to apply the acid treatment agent to the entirety of the image formation surface of the recording medium by means of coating using a coating roller or the like, because in this way, the amount of the acid treatment applied is uniformly adjusted; fine lines, fine image portions, and the like are uniformly recorded; and density unevenness such as image unevenness is suppressed.

Examples of the coating method in which the amount of the acid treatment agent applied is controlled within the above range include a method using an anilox roller. The anilox roller is a roller whose surface is coated with ceramic by thermal spraying and processed with laser such that a pyramidal shape, a diagonal line, a hexagonal shape, or the like is formed thereon. The acid treatment agent flows into recess portions formed on the roller surface and is transferred to paper by coming into contact with the surface of paper, and in this way, the paper is coated with the acid treatment agent in a coating amount controlled by the recesses of the anilox roller.

<Ink Applying Step>

In the ink applying step, the ink composition is jetted onto a recording medium by the ink jet method.

In the process of forming an image by the ink jet method, by the supply of energy, the ink composition is jetted onto a recording medium, and a colored image is formed. As the ink jet method preferable for the present invention, the method described in paragraphs "0093" to "0105" in JP2003-306623A can be used.

The ink jet method is not particularly limited. For example, the ink jet method may be any of a charge controlling method in which an ink is jetted using electrostatic attraction force; a drop-on-demand method (a pressure pulse method) using vibration pressure of a piezoelectric element; an acoustic ink jet method in which an electric signal is converted into an acoustic beam and radiated to an ink, and the ink is jetted using the radiation pressure; and a thermal ink jet method in which air bubbles are formed by heating an ink, and the generated pressure is used.

Furthermore, the ink jet head used in the ink jet method may be an on-demand type or a continuous type. In addition, an ink nozzle or the like used at the time of performing recording by the ink jet method is not particularly limited, and can be appropriately selected according to the purpose.

The ink jet method includes a method of ejecting a large number of inks with low density called photo ink in a small volume, a method of improving image quality by using a plurality of inks which has substantially the same color and different density, and a method of using a colorless and transparent ink.

The ink jet method also includes a shuttle method of using a short serial head, in which recording is performed while a recording medium is being scanned in a width direction by the head, and a line method using a line head in which recording elements corresponding to the entire region of one side of a recording medium are arranged. In the line method, the recording medium is scanned in a direction orthogonal to the arrangement direction of the recording elements, and accordingly, an image can be recorded on the entire surface of the recording medium, and a transport system such as a carriage scanning the short head is not required. Moreover, complicated scanning control for moving a carriage and a recording medium is not required, and only the recording medium is moved. Therefore, the recording speed can be further increased in the line method than in the shuttle method.

In the present invention, the acid treatment step and the ink applying step can be performed in any order without particular limitation. However, from the viewpoint of image quality, an embodiment is preferable in which the ink applying step is performed after the acid treatment agent applying step. That is, the ink applying step is preferably a step of applying the ink composition onto a recording medium to which the acid treatment agent has been applied.

In the ink applying step, from the viewpoint of forming a high-definition print, the amount of the ink composition droplets jetted by the ink jet method is preferably 1.5 pL to 3.0 pL, and more preferably 1.5 pL to 2.5 pL. The amount of the ink composition droplets jetted can be regulated by appropriately adjusting the jetting conditions.

<Ink Drying Step>

If necessary, the ink jet recording method of the present invention may include an ink drying step of drying and removing the solvent (for example, water or the aqueous medium described above) in the ink composition applied onto the recording medium. The ink drying step is not particularly limited as long as it can remove at least a portion of the ink solvent, and generally used methods can be applied.

<Ink Removing Step>

If necessary, the ink jet recording method of the present invention may include an ink removing step of removing the ink composition stuck to the ink jet recording head (for example, dried and solidified ink solid) by using a maintenance liquid. Regarding the details of the maintenance liquid and the ink removing step, the maintenance liquid and the ink removing step described in WO2013/180074A can be preferably applied.

EXAMPLES

Hereinafter, based on examples, the present invention will be more specifically described, but the present invention is not limited to the examples. Herein, unless otherwise specified, "part" and "%" are based on mass.

[Synthesis Example 1] Synthesis of Compound Used as Component (a)

<Synthesis of Compound (I)>

20.0 g of propionic anhydride was put into a 200 mL three-neck flask equipped with a stirring rod and a thermometer, and 16.6 g of diglycolamine was added dropwise thereto over 2 hours, followed by heating for 1 hour at 80° C. The reaction product was distilled at 0.5 mmHg and 180° C., thereby obtaining 18.6 g of a compound (I).

$^1$H-NMR: 1.21 (t, 3H), 2.27 (d, 2H), 3.3-3.7 (m, 8H), 3.4 (br, s, 1H), 6.4 (br, s, 1H)

<Synthesis of Compounds (II), (VI), (VII), (X), and (XI)>
Based on the synthesis method of the compound (I), compounds (II), (VI), (VII), (X), and (XI) were synthesized.
—Compound (II)—
The compound (II) was obtained by the same method as the synthesis method of the compound (I), except that acetic anhydride was used instead of propionic anhydride.
$^1$H-NMR: 1.91 (s, 3H), 3.2-3.9 (m, 8H), 3.3 (br, s, 1H), 6.3 (br, s, 1H)
—Compound (VI)—
The compound (VI) was obtained by the same method as the synthesis method of the compound (I), except that 3-amino-1-propanol was used instead of diglycolamine.
$^1$H-NMR: 1.00 (t, 3H), 1.58 (m, 2H), 2.30 (d, 2H), 3.1 (m, 2H), 3.52 (m, 2H), 4.2 (br, s, 1H)
—Compound (VII)—
The compound (VII) was obtained by the same method as the synthesis method of the compound (I), except that acetic anhydride was used instead of propionic anhydride, and 4-amino-1-butanol was used instead of diglycolamine.
$^1$H-NMR: 1.85 (s, 3H), 1.2-1.6 (m, 4), 3.0-3.7 (m, 4H), 4.5 (br, s, 1H)
—Compound (X)—
The compound (X) was obtained by the same method as the synthesis method of the compound (I), except that N-methylaminoethanol was used instead of diglycolamine.
$^1$H-NMR: 2.32 (s, 3H), 3.47 (s, 3H), 3.3-3.7 (m, 4H)
—Compound (XI)—
The compound (XI) was obtained by the same method as the synthesis method of the compound (I), except that acetic anhydride was used instead of pripionic anhydride, and N-ethylaminoethanol was used instead of diglycolamine.
$^1$H-NMR: 1.00 (t, 3H), 2.22 (s, 3H), 3.3-3.8 (m, 4H)
<Synthesis of Compound (III)>
50 ml of ethyl acetate and 20 g of ethanolamine were put into a 200 mL three-neck flask equipped with a stirring rod and a thermometer. The resulting solution was kept at a temperature of equal to or lower than 10° C., 24 g of ethyl isocyanate was then added dropwise thereto over 2 hours, and then the resulting solution was reacted for 2 hours at room temperature. After being ice-cooled, the reaction product was filtered and washed, thereby obtaining 42.7 g of a compound (III).
$^1$H-NMR: 1.10 (t, 3H), 3.20 (d, 2H), 3.2-3.7 (m, 4H), 5.9-6.2 (br, s, 2H)
<Synthesis of Compound (IV)>
50 ml of ethyl acetate and 20 g of ethylene glycol were put into a 200 mL three-neck flask equipped with a stirring rod and a thermometer. The resulting solution was kept at a temperature of equal to or lower than 10° C., and then 24 g of ethyl isocyanate was added dropwise thereto over 2 hours. Thereafter, 0.1 g of tributyltin was added thereto, and the resulting solution was reacted for 2 hours at 40° C. The reaction solution was subjected to liquid separation by using ethyl acetate and water and concentrated. Thereafter, the reaction solution was subjected separation purification by means of column chromatography (ethyl acetate:methanol=10:1), thereby obtaining 32.2 g of a compound (IV).
$^1$H-NMR: 1.02 ppm (t, 3H), 3.02 ppm (d, 2H), 3.4-4.2 (m, 4H), 4.2 (br, s, 1H)
<Synthesis of Compound (V)>
200 ml of dichloromethane, 29.2 g of triethylamine, and 15 g of ethanolamine were put into a 500 mL three-neck flask equipped with a stirring rod and a thermometer. Then, 27.5 g of ethyl chloroformate was added dropwise thereto over 2 hours, and then the resulting solution was reacted for 2 hours at room temperature. The reaction solution was subjected to liquid separation using ethyl acetate and water, and the organic phase was concentrated. Thereafter, the reaction solution was subjected to separation purification by manes of column chromatography (ethyl acetate:methanol=10:1), thereby obtaining 24.2 g of a compound (V).
$^1$H-NMR: 1.29 ppm (t, 3H), 4.13 ppm (d, 2H), 3.0-3.7 (m, 4H), 4.2 (br, s, 1H)
<Synthesis of Compounds (VIII) and (IX)>
Compounds (VIII) and (IX) were synthesized based on the synthesis method of the compound (III). Herein, 2-(2-(2-(2-aminoethoxy)ethoxy)ethoxy)ethanol used as a raw material for synthesizing the compound (IX) was synthesized by the method described in J. Am. Chem. Soc. 2003, 125, p. 1120.
—Compound (VIII)—
The compound (VIII) was obtained by the same method as the synthesis method of the compound (III), except that 1-amino-2-propanol was used instead of ethanolamine.
$^1$H-NMR: 1.05 (s, 3H), 1.12 ppm (s, 3H), 3.2-3.8 (m, 5H), 3.5 (br, s, 1H), 5.8 (br, 1H), 5.9 (br, 1H)
—Compound (IX)—
The compound (IX) was obtained by the same method as the synthesis method of the compound (III), except that 2-(2-(2-(2-aminoethoxy)ethoxy)ethoxy)ethanol was used instead of ethanolamine, and n-butyl isocyanate was used instead of ethyl isocyanate.
$^1$H-NMR: 0.90 (s, 3H), 1.3-1.5 (m, 4H), 3.2-3.8 (m, 18H), 3.5 (br, s, 1H), 6.0 (br, 2H)

[Synthesis Example 2] Synthesis of Water-Insoluble Polymer Dispersant Q-1

Methacrylic acid (172 parts), benzyl methacrylate (828 parts), and isopropanol (375 parts) were mixed together, thereby preparing a monomer-supplying composition. Furthermore, 2,2-azobis(2-methylbutyronitrile) (22.05 parts) and isopropanol (187.5 parts) were mixed together, thereby preparing an initiator-supplying composition.
Then, isopropanol (187.5 parts) was heated to 80° C. in a nitrogen atmosphere, and a mixture of the monomer-supplying composition and the initiator-supplying composition was added dropwise thereto over 2 hours. After the dropwise addition ended, the resulting solution was kept at 80° C. for 4 hours and then cooled to 25° C.
After cooling, the solvent was removed under reduced pressure, thereby obtaining a water-insoluble polymer dispersant Q-1 having an weight average molecular weight of about 30,000 and an acid value of 112 mgKOH/g.

[Preparation Example 1] Preparation of Pigment Dispersion

<Preparation of Cyan Pigment Dispersion C-1>
By using an aqueous potassium hydroxide solution, 0.8 equivalents of methacrylic acid in the water-insoluble polymer dispersion Q-1 (150 parts) obtained as above was neutralized, and then deionized water was added thereto such that the concentration of Q-1 became 25%, thereby obtaining an aqueous solution of a water-insoluble polymer dispersion.
The aqueous solution of a water-insoluble polymer dispersion (124 parts), Pigment Blue 15:3 (cyan pigment) (48 parts), water (75 parts), and dipropylene glycol (30 parts) were mixed together, and the mixture was dispersed using a beads mill (bead diameter: 0.1 mmϕ, zirconia beads) until an intended volume average particle size was achieved, thereby obtaining a dispersion (non-crosslinked dispersion C-1) of polymer-coated cyan pigment particles having a pigment concentration of 15%.

DENACOL EX-321 (a cross-linking agent, manufactured by Nagase ChemteX Corporation.) (1.3 parts) and an aqueous boric acid solution (boric acid concentration: 4% by mass) (14.3 parts) were added to the non-crosslinked dispersion C-1 (136 parts), and the resulting solution was reacted for 6.5 hours at 50° C. and then cooled to 25° C., thereby obtaining a cross-linked dispersion C-1. Thereafter, deionized water was added to the cross-linked dispersion C-1, and the dispersion was purified by ultrafiltration using a stirring-type ULTRA HOLDER (manufactured by ADVANTEC MFS, Inc.) and a filter for ultrafiltration (manufactured by ADVANTEC MFS, Inc., molecular weight cut off: 50,000, Q0500076E ULTRA FILTER) such that the concentration of dipropylene glycol in the dispersion became equal to or less than 0.1% by mass. Then, the dispersion was concentrated until the pigment concentration became 15%, thereby obtaining a cyan pigment dispersion C-1. The pigment contained in the cyan pigment dispersion C-1 is a polymer-coated pigment (encapsulated pigment) whose surface is coated with a cross-linked polymer which is Q-1 cross-linked by a cross-linking agent.

<Preparation of Magenta Pigment Dispersion M-1>

A magenta pigment dispersion M-1 was obtained by the same method as the method for preparing the cyan pigment dispersion C-1, except that, in the preparation of the cyan pigment dispersion C-1, Pigment Red 122 (magenta pigment) was used instead of Pigment Blue 15:3 (cyan pigment) used as a pigment.

<Preparation of Black Pigment Dispersion K-1>

A black pigment dispersion K-1 was obtained by the same method as the method for preparing the cyan pigment dispersion C-1, except that, in the preparation of the cyan pigment dispersion C-1, carbon black MA-100 (black pigment) was used instead of Pigment Blue 15:3 (cyan pigment) used as a pigment.

[Synthesis Example 3] Synthesis of Polymer Used for Forming Fine Polymer Particles as Component (c)

<Synthesis of Polymer P-1>

360.0 g of methyl ethyl ketone was put into a 2 L three-neck flask equipped with a stirring rod, a thermometer, a reflux cooling pipe, and nitrogen gas introduction pipe, and heated to 75° C. Then, while the internal temperature of the flask was being kept at 75° C., a mixed solution of 151.2 g of isobornyl methacrylate, 172.8 g of methyl methacrylate, 36.0 g of methacrylic acid, 72 g of methyl ethyl ketone, and 1.44 g of a polymerization initiator (trade name: V-601, manufactured by Wako Pure Chemical Industries, Ltd.) was added dropwise thereto at a constant speed such that the dropwise addition ended within 2 hours. After the dropwise addition ended, a solution composed of 0.72 g of "V-601" and 36.0 g of methyl ethyl ketone was added thereto, followed by stirring for 2 hours at 75° C. Thereafter, a solution composed of 0.72 g of "V-601" and 36.0 g of isopropanol was further added thereto, followed by stirring for 2 hours at 75° C. Subsequently, the mixed solution was heated to 85° C. and continuously stirred for 2 hours, thereby obtaining a solution containing a copolymer (polymer P-1) of isobornyl methacrylate/methyl methacrylate/methacrylic acid=42/48/10 [mass ratio]. The polymer P-1 had an SP value (Okitsu method) of 19.36, a weight average molecular weight of 58,000, and an acid value of 65.1 mgKOH/g.

<Synthesis of Polymer P-2>

A solution containing a copolymer (polymer P-2) was obtained by the same method as the synthesis method of the polymer P-1, except that 219.6 g of methyl methacrylate, 54.0 g of isobornyl methacrylate, 36.0 g of methacrylic acid, and 50.4 g of stearyl methacrylate were used as monomers. The polymer P-2 had an SP value (Okitsu method) of 17.01, a weight average molecular weight of 61,000, and an acid value of 65.2 mgKOH/g.

<Synthesis of Polymer P-3>

A solution containing a copolymer (polymer P-3) was obtained by the same method as the synthesis method of the polymer P-1, except that 261.0 g of methyl methacrylate, 36.0 g of methacrylic acid, and 63.0 g of acrylamide were used as monomers. The polymer P-3 had an SP value (Okitsu method) of 23.97, a weight average molecular weight of 61,000, and an acid value of 65.1 mgKOH/g.

<Synthesis of Polymer P-4>

A solution containing a copolymer (polymer P-4) was obtained by the same method as the synthesis method of the polymer P-1, except that 216.0 g of methyl methacrylate, 36.0 g of methacrylic acid, and 108.0 g of acrylamide were used as monomers. The polymer P-4 had an SP value (Okitsu method) of 26.83, a weight average molecular weight of 58,000, and an acid value of 65.0 mgKOH/g.

<Synthesis of Polymer P-5>

A solution containing a copolymer (polymer P-5) was obtained by the same method as the synthesis method of the polymer P-1, except that 180.0 g of methyl methacrylate, 36.0 g of isobornyl methacrylate, 36.0 g of methacrylic acid, and 108.0 g of stearyl methacrylate were used as monomers. The polymer P-5 had an SP value (Okitsu method) of 13.96, a weight average molecular weight of 60,000, and an acid value of 65.3 mgKOH/g.

[Preparation Example 2] Preparation of Fine Polymer Particles as Component (c)

<Preparation of Fine Particles of Polymer P-1>

668.3 g of the solution of the polymer P-1 obtained in Synthesis example 3 was weighted out, and 388.3 g of isopropanol and 145.7 ml of a 1 mol/L aqueous NaOH solution were added thereto, followed by heating such that the internal temperature of the reaction container became 80° C. Then, 720.1 g of distilled water was added dropwise to the heated solution at a rate of 20 ml/min such that the polymer was dispersed in water. Thereafter, at an atmospheric pressure, the internal temperature of the reaction container was kept at 80° C. for 2 hours, at 85° C. for 2 hours, and then at 90° C. for 2 hours. Subsequently, the internal pressure of the reaction container was reduced, and a total of 913. 7 g of isopropanol, methyl ethyl ketone, and distilled water were distilled away, thereby obtaining an aqueous dispersion of fine particles of the self-dispersing polymer P-1 (concentration of solid content (concentration of polymer particles): 28.0%, volume average particle size: 3.0 nm).

<Preparation of Fine Particles of Polymer P-2>

An aqueous dispersion of fine particles of the polymer P-2 was obtained by the same method as used in Preparation example 2, except that a solution of the polymer P-2 was used instead of the solution of the polymer P-1 (concentration of solid content (concentration of polymer particles): 27.4%, volume average particle size: 3.2 nm).

<Preparation of Fine Particles of Polymer P-3>

An aqueous dispersion of fine particles of the polymer P-2 was obtained by the same method as used in Preparation example 2, except that a solution of the polymer P-3 was used instead of the solution of the polymer P-1 (concentration of polymer particles: 27.6%, volume average particle size: 2.9 nm).

<Preparation of Fine Particles of Polymer P-4>

An aqueous dispersion of fine particles of the polymer P-4 was obtained by the same method as used in Preparation example 2, except that a solution of the polymer P-4 was used instead of the solution of the polymer P-1 (concentration of polymer particles: 27.8%, volume average particle size: 3.5 nm).

<Preparation of Fine Particles of Polymer P-5>

An aqueous dispersion of fine particles of the polymer P-5 was obtained by the same method as used in Preparation example 2, except that a solution of the polymer P-5 was used instead of the solution of the polymer P-1 (concentration of polymer particles: 27.9%, volume average particle size: 3.9 nm).

[Synthesis Example 4] Synthesis of Water-Soluble Polymer Compound

A water-soluble polymer compound (water-soluble polymer 1) used as a component in the acid treatment agent was synthesized according to the description of paragraphs "0200" to "0204" and "0299 of JP2013-001854A.

The water-soluble polymer 1 consists of the following three structural units. The number described in each of the following structural units represents a mass ratio, and Mw represents a weight average molecular weight. Furthermore, Me represents methyl, and Et represents ethyl. The water-soluble polymer 1 is a random copolymer.

Water-Soluble Polymer 1

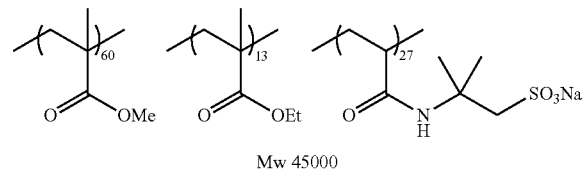

Mw 45000

[Example] Preparation of Ink Composition

The components were mixed together according to the following formulation composition, and a coarse particles were removed through a membrane filter (pore diameter: 0.5 μm), thereby obtaining black inks (ink compositions) of Examples 1-8 and 10-20.

The obtained black inks had physical properties in which the viscosity was 4.0 mPa·s to 6.3 mPa·s (30° C.), the surface tension was 30.4 mN/m to 37.0 mN/m (25° C.), and the pH was 8.2 to 9.5 (25° C.).

Herein, the viscosity, surface tension, and pH were measured using a VISCOMETER TV-22 (manufactured by TOM SANGYO CO., LTD), an automatic surface tensiometer CBVP-Z (manufactured by Kyowa Interface Science Co., LTD.), and a pH meter WM-50EG (manufactured by DDK-TOA CORPORATION) respectively.

<Composition of Black Ink>

| | |
|---|---|
| Black pigment dispersion K-1 | 15.0% |
| Magenta pigment dispersion M-1 | 4.0% |
| Cyan pigment dispersion C-1 | 4.0% |
| 2-Pyrrolidone | 0.5% |
| Compound as component (a) described in Table (1) (the structure of each compound is as described above) | Amount described in Table 1 |
| Propylene glycol (manufactured by ADEKA CORPORATION) | 2.0% |
| MFTG (manufactured by Nippon Nyukazai Co., Ltd.) | 2.0% |
| OLFINE E1010 (manufactured by Nissin Chemical Co., Ltd.) | 0.3% |
| OLFINE E1020 (manufactured by Nissin Chemical Co., Ltd.) | 1.0% |
| Fine polymer particles as component (c) described in Table 1 | 8.0% |
| PVP K-15 (manufactured by ISB Japan, Ltd.) | 0.2% |
| Urea | 5.0% |
| CELLOSOL 524 (manufactured by CHUKYO YUSHI CO., LTD.) | 1.5% |
| Lithium chloride (inorganic salt) | 0.01% |
| SNOWTEX XS (manufactured by NISSAN CHEMICAL INDUSTRIES, LTD, colloidal silica) | 0.3% |
| CAPSTONE FS-63 (manufactured by DuPont, surfactant) | 0.01% |
| BYK-024 (manufactured by BYK-Chemie Japan K.K, antifoaming agent) | 0.01% |
| Deionized water | Balance for making 100% in total |

[Comparative Example] Preparation of Ink Composition

Black inks (ink compositions) of Comparative examples 1 to 6 were prepared by the same method as used in the above example, except that, in the formulation composition of the above example, the compounds shown in the following Table 1 were used instead of the compound as the component (a). The structures of the compounds used in Comparative examples 1 to 6 are shown below.

(x-1)

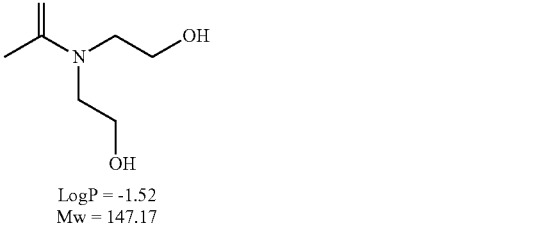

LogP = −1.52
Mw = 147.17

(x-2)

LogP = −0.48
Mw = 128.17

(x-3)

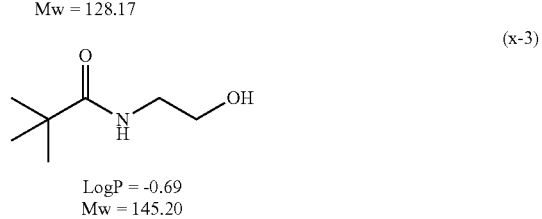

LogP = −0.69
Mw = 145.20

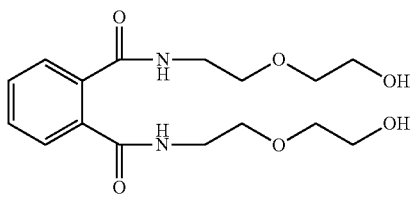

LogP = -1.03
Mw = 340.37

(x-4)

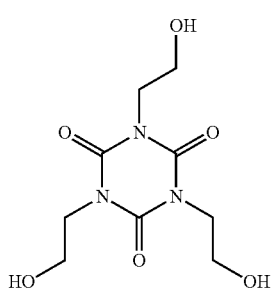

LogP = -1.98
Mw = 261.28

(x-5)

The compound (x-1) was synthesized by the method described in EP956318B1.

As the compound (x-2), N,N'-dimethylpropione urea (manufactured by Tokyo Chemical Industry Co., Ltd.) was used.

The compound (x-3) was synthesized by the method described in JP1994-41484A (JP-H06-41484A).

The compound (x-4) was synthesized by the same method as the synthesis method of the compound (V) described above, except that 2-(aminoethoxy)ethanol was used instead of ethanolamine, and phthaloyl chloride was used instead of ethyl chloroformate.

—Compound (x-4)—

$^1$H-NMR: 3.2-3.5 (m, 16H), 4.1 (br, s, 2H), 6.0-6.3 (br, 2H), 7.5-8.0 (m, 4H)

As the compound (x-5), tris(2-hydroxyethyl)isocyanate (manufactured by Tokyo Chemical Industry Co., Ltd.) was used.

[Reference Example] Preparation of Acid Treatment Agent

The components were mixed together according to the following formulation composition, thereby obtaining an acid treatment liquid (acid treatment agent).

The obtained acid treatment liquid had physical properties in which the viscosity was 4.2 mPa·s (25° C.), the surface tension was 40.8 mN/m (25° C.), and the pH was 0.1 (25° C.).

Herein, the viscosity, surface tension, and pH were measured using a VISCOMETER TV-22 (manufactured by TOM SANGYO CO., LTD), an automatic surface tensiometer CBVP-Z (manufactured by Kyowa Interface Science Co., LTD.), and a pH meter WM-50EG (manufactured by DDK-TOA CORPORATION) respectively.

<Composition of Acid Treatment Liquid>

| | |
|---|---|
| TPGmME (tripropylene glycol monomethyl ether) | 4.8% |
| DEGmBE (diethylene glycol monobutyl ether) | 4.8% |
| Malonic acid | 16.0% |
| Malic acid | 7.8% |
| Propane tricarboxylic acid | 3.5% |
| 85% by mass aqueous solution of phosphoric acid | 15.0% |
| Water-soluble polymer 1 described above | 0.6% |
| Antifoaming agent (TSA-739 (15%) manufactured by Momentive Performance Materials Japan LLC; emulsion-type silicone antifoaming agent) | 0.07% |
| Deionized water | Balance making 100% in total |

[Test Example 1] Evaluation of Curling and Stacker Blocking

<Image Formation>

A GELJET GX5000 printer head manufactured by Ricoh Company Ltd was prepared. It was a printer head in which 96 nozzles lined up. The printer head was fixed and disposed into the ink jet recording device illustrated in FIG. 1 in JP2013-223960A.

As a recording medium, OK TOPCOAT +" (paper thickness: 104.7 μm, manufactured by Oji Paper Co., Ltd.) was prepared. By sequentially performing the following acid treatment step, drying step, and ink applying step, an image was formed (recorded) on the recording medium.

At this time, the printer head was disposed such that the direction along which the 96 nozzles lined up slanted by an angle of 75.7° with respect to the direction along which the printer head was orthogonal to the movement direction of the stage of the ink jet recording device on the same plane.

—Acid Treatment Step—

In a room controlled to be at a temperature of 25° C. and a humidity of 50% RH, the OK TOPCOAT was fixed onto the stage movable in the longitudinal direction at 500 mm/sec, and the paper was coated with the acid treatment agent obtained as above by using a wire bar coater at 1.7 g/m².

—Drying Step—

Within the recording medium, the site coated with the acid treatment agent was dried at 50° C. by using a dryer. The drying begun at a point in time when 1.5 seconds elapsed from the end of the application of the acid treatment liquid and ended at a point in time when 3.5 seconds elapsed from the end of the application of the acid treatment liquid. At this time, the drying time was set to be 2 seconds.

—Ink Applying Step—

Within 2 seconds after the drying step, by the following method, the ink was started to be jetted onto the surface applied with the acid treatment liquid.

—Jetting Method—

While the recording medium was being moved in the movement direction of the stage at a constant speed, the black ink prepared as above was jetted from the aforementioned printer head by a line method under the jetting conditions of an amount of ink droplets of 3.5 pL, a jetting frequency of 24 kHz, a resolution of 1,200 dpi×1,200 dpi (dot per inch), and a stage speed of 50 mm/s, thereby printing a solid image. The black ink was used after deaerated through a deaeration filter and then controlled to be at 30° C.

<Evaluation of Curling>

In a room controlled to be at a temperature of 25° C. and a humidity of 50% RH, a sample (paper medium) for evaluation on which a solid image was formed was placed, the image formation side up, on a hot plate at 50° C., and immediately dried for 30 seconds at 120° C. by using a dryer. Then, the paper medium was cut in a size of 0.5 cm (width, short side)×5 cm (length, long side), and hung down by a clip put on one of the shorts sides of the paper medium. In this state, the paper medium was left as it was for 24 hours in a room controlled to be at a temperature of 25° C. and a humidity of 50% RH. After 24 hours, the radius of curvature of the paper was measured, and a value of L=1/(radius of curvature) was calculated and evaluated based on the following evaluation criteria. A sample evaluated to be A to C according to the following evaluation criteria can be determined as being within a range acceptable for practical use.

(Evaluation Criteria of Curling)
A: L≤0.1
B: 0.1<L≤0.4
C: 0.4<L≤0.8
D: 0.8<L≤2.0
E: 2.0<L The results are shown in the following Table 1.

<Evaluation of Stacker Blocking>

The sample for evaluation on which a solid image was formed by the image formation described above was left as it was for 24 hours and cut into two sheets in a size of 3 cm×3 cm, and each of the sheets was weighed. Then, the two sheets were stacked such that the four corners of one sheet coincided with four corners of the other and the printing surfaces of the two sheets faced each other. The stacked sheets were placed on a hot plate at 50° C. under environmental conditions of 60° C. and 50% RH. On the sheets, a 2.5 cm×2.5 cm×0.3 cm flat rubber plate was placed such that the 2.5 cm×2.5 cm surface thereof faced the paper side, and then a 2.5 cm×2.5 cm×0.3 cm flat plastic plate was additionally placed on the rubber plate such that the 2.5 cm×2.5 cm surface thereof faced the rubber plate. On the plastic plate, a container weighing 260 g and containing beads was placed and left stand for 20 minutes, and then the two sheets of stacked paper was peeled off. Thereafter, the paper on the hot plate side was weighed, and the change of the weight was measured. In this way, a rate of change was determined and evaluated based on the following evaluation criteria.

(Evaluation Criteria of Stacker Blocking)
A: The rate of change was less than 0.03%.
B: The rate of change was equal to or greater than 0.03% and less than 0.07%.
C: The rate of change was equal to or greater than 0.07% and less than 0.1%.
D: The rate of change was equal to or greater than 0.1% and less than 1%.
E: The rate of change was equal to or greater than 1%.

The results are shown in the following Table 1.

TABLE 1

| | Component (a) | | | | Component (c) | | Upper limit of logP value satisfying Expression I | Whether or not Expression I is satisfied | Evaluation of curling | Evaluation of stacker blocking |
|---|---|---|---|---|---|---|---|---|---|---|
| | Type | logP value | MW | Content in ink composition (mass %) | Type | SP value | | | | |
| Example 1 | (I) | −0.74 | 161.20 | 12 | P-1 | 19.36 | −0.25 | Satisfied | A | A |
| Example 2 | (II) | −1.39 | 147.17 | 12 | | | | Satisfied | A | A |
| Example 3 | (III) | −0.99 | 132.16 | 12 | | | | Satisfied | B | A |
| Example 4 | (IV) | −0.31 | 133.15 | 12 | | | | Satisfied | A | A |
| Example 5 | (V) | −0.31 | 133.15 | 12 | | | | Satisfied | B | A |
| Example 6 | (VI) | −0.48 | 131.17 | 12 | | | | Satisfied | B | A |
| Example 7 | (VII) | −0.68 | 145.20 | 12 | | | | Satisfied | B | A |
| Example 8 | (VIII) | −0.67 | 146.19 | 12 | | | | Satisfied | B | A |
| Reference example | (IX) | −0.56 | 292.37 | 12 | | | | Satisfied | B | B |
| Example 10 | (X) | −0.35 | 131.17 | 12 | | | | Satisfied | A | A |
| Example 11 | (XI) | −0.66 | 131.17 | 12 | | | | Satisfied | A | B |
| Example 12 | (I) | −0.74 | 161.20 | 6 | | | | Satisfied | A | A |
| Example 13 | (I) | | | 1 | | | | Satisfied | A | A |
| Example 14 | (I) | | | 30 | | | | Satisfied | A | A |
| Example 15 | (I) | | | 35 | | | | Satisfied | A | B |
| Example 16 | (I) | | | 12 | P-3 | 23.97 | −0.46 | Satisfied | A | A |
| Example 17 | (II) | −1.39 | 147.17 | 12 | | | | Satisfied | A | A |
| Example 18 | (III) | −0.99 | 132.16 | 12 | | | | Satisfied | B | A |
| Example 19 | (VI) | −0.48 | 131.17 | 12 | | | | Satisfied | B | A |
| Example 20 | (IV) | −0.31 | 133.15 | 12 | P-2 | 17.01 | −0.14 | Satisfied | B | B |
| Comparative example 1 | (x-1) | −1.52 | 147.17 | 12 | P-1 | 19.36 | −0.25 | Satisfied | E | E |
| Comparative example 2 | (x-2) | −0.48 | 128.17 | 12 | | | | Satisfied | E | A |
| Comparative example 3 | (x-3) | 0.69 | 145.20 | 12 | | | | Not satisfied | E | E |
| Comparative example 4 | (x-4) | −1.03 | 340.37 | 12 | | | | Satisfied | D | E |
| Comparative example 5 | (x-5) | −1.98 | 261.28 | 12 | | | | Not satisfied | E | E |
| Comparative example 6 | (IV) | −0.31 | 133.15 | 12 | P-3 | 23.97 | −0.46 | Not satisfied | D | D |
| Comparative example 7 | (IV) | −0.31 | 133.15 | 12 | P-4 | 26.83 | −0.59 | Not satisfied | E | E |
| Comparative example 8 | | | | | P-5 | 13.96 | Unusable due to poor dispersion stability of component (c) | | | |

As shown in Table 1, when an image was formed using the ink compositions of Comparative examples 1, 4, and 5 using a compound, which had two or more hydroxyl groups but did not have the structure represented by Formula (I), by ink jet recording, both of the curling inhibition effect and the stacker blocking inhibition effect were poor.

When an image was formed using the ink composition of Comparative example 2 using a compound, which had neither a hydroxyl group nor the structure represented by Formula (I), by ink jet recording, the curling inhibition effect was poor.

When an image was formed using the ink compositions of Comparative examples 3 and 6, in which the compound having the structure represented by Formula (I) was used but the relationship between the log P value and the SP value did not satisfy Expression I, by ink jet recording, both of the curling inhibition effect and the stacker blocking inhibition effect were poor.

In Comparative example 7 in which the SP value of the component (c) was greater than the upper limit specified by the present invention, the relationship between the log P value of the component (a) and the SP value of the component (c) did not satisfy the specification of the present invention, and both of the curling inhibition effect and the stacker blocking inhibition effect were poor.

In Comparative example 8 in which the SP value of the component (c) was lower than the lower limit specified by the present invention, the dispesion stability of the component (c) in the ink composition was poor, and hence Comparative example 8 could not be used as an ink composition.

In contrast, it was found that, in a case where the ink composition included in the present invention was used for forming an image by ink jet recording, both of the curling inhibition effect and the stacker blocking inhibition effect were excellent.

What is claimed is:

1. An ink composition comprising:
   (a) a compound which is represented by the following Formula (1) and has a molecular weight of equal to or greater than 130 and equal to or less than 300,

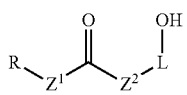    Formula (1)

(in Formula (1), R represents an alkyl group having 1 to 10 carbon atoms; $Z^1$ represents a single bond, $-NR^1-$, or $-O-$; $Z^2$ represents $-NR^1-$ or $-O-$; at least one of $Z^1$ or $Z^2$ is $-NR^1-$; $R^1$ represents a hydrogen atom or an alkyl group having 1 to 10 carbon atoms; and L represents an alkylene group having 1 to 10 carbon atoms or $-C_2H_4-O-C_2H_4-$);
   (b) a colorant;
   (c) a polymer having an SP value of equal to or greater than 17 and equal to or less than 24; and
   (d) water,
   wherein a log P value of the component (a) and an SP value of the component (c) satisfy the following Expression I, $-1.7 \leq \log P \text{ value of component}(a) \leq -0.0456 \times SP \text{ value of component}(c) + 0.6319.$    [Expression 1]

2. The ink composition according to claim 1, wherein R in the Formula (1) is an alkyl group having 1 to 6 carbon atoms.

3. The ink composition according to claim 1, wherein the component (a) is a compound represented by the following Formula (2) or (3):

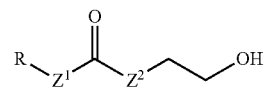    Formula (2)

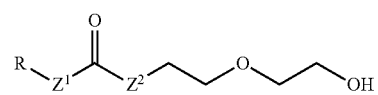    Formula (3)

in Formulae (2) and (3), each of R, $Z^1$, and $Z^2$ has the same definition as R, $Z^1$, and $Z^2$ in the Formula (1).

4. The ink composition according to claim 1, wherein the component (a) is a compound represented by any one of the following Formulae (4) to (9):

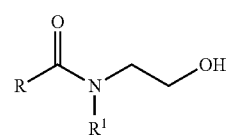    Formula (4)

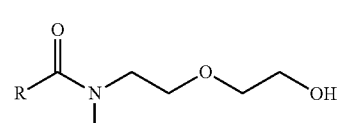    Formula (5)

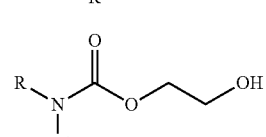    Formula (6)

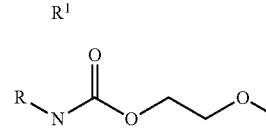    Formula (7)

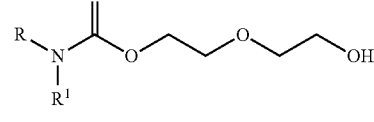    Formula (8)

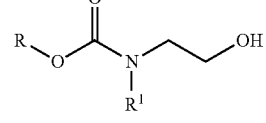    Formula (9)

in Formulae (4) to (9), each of R and $R^1$ has the same definition as R and $R^1$ in the Formula (1).

5. The ink composition according to claim 1 wherein the content of the component (a) is 1% by mass to 30% by mass.

6. The ink composition according to claim 4 wherein the content of the component (a) is 1% by mass to 30% by mass.

7. The ink composition according to claim 1 that is an ink for ink jet recording.

8. The ink composition according to claim 1, wherein the component (c) is fine polymer particles.

9. An ink set comprising:
the ink composition according to claim 1; and
an acid treatment agent containing an acidic compound.

10. The ink set according to claim 9,
wherein the acidic compound is an acid having a molecular weight of equal to or greater than 50 and equal to or less than 200, and having a pKa value of equal to or greater than 1 and equal to or less than 5 in water of 25° C.

11. An ink jet recording method comprising:
jetting the ink composition according to claim 1 onto a recording medium.

12. The ink jet recording method according to claim 11, wherein the recording medium is a paper medium.

13. The ink jet recording medium according to claim 12, wherein the paper medium is coated paper.

14. The ink jet recording method according to claim 11, further comprising:
an acid treatment step of applying an acid treatment agent containing an acidic compound onto the recording medium; and
an ink applying step of jetting the ink composition according to claim 1 onto the recording medium having undergone the acid treatment step such that an image is formed.

* * * * *